US012271121B2

(12) United States Patent
Adams et al.

(10) Patent No.: US 12,271,121 B2
(45) Date of Patent: Apr. 8, 2025

(54) TONER CARTRIDGE HAVING POSITIONING FEATURES

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Brian Lee Hawes, Versailles, KY (US); Brittany Nicole Sexton, Lexington, KY (US); Glen Alan Reidhaar, Lexington, KY (US); Edward Lynn Triplett, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/415,146

(22) Filed: Jan. 17, 2024

(65) Prior Publication Data

US 2024/0288796 A1 Aug. 29, 2024

Related U.S. Application Data

(60) Provisional application No. 63/472,849, filed on Jun. 14, 2023, provisional application No. 63/454,891, filed on Mar. 27, 2023, provisional application No. 63/449,643, filed on Mar. 3, 2023, provisional application No. 63/448,061, filed on Feb. 24, 2023.

(51) Int. Cl.
*G03G 15/08* (2006.01)
*G03G 15/00* (2006.01)

(52) U.S. Cl.
CPC ......... *G03G 15/0875* (2013.01); *G03G 15/80* (2013.01); *G03G 2215/068* (2013.01)

(58) Field of Classification Search
USPC .......................................................... 399/262
See application file for complete search history.

(56) References Cited

U.S. PATENT DOCUMENTS 4,591,258 A 5/1986 Nishino
5,758,233 A 5/1998 Coffey et al.
5,768,661 A 6/1998 Coffey et al.
(Continued)

OTHER PUBLICATIONS

International Search Report and Written Opinion of the International Searching Authority dated Jun. 10, 2024 for PCT Application No. PCT/US24/16355.

*Primary Examiner* — Quana Grainger
(74) *Attorney, Agent, or Firm* — Justin M. Tromp

(57) ABSTRACT

A toner container according to one example embodiment includes a drive coupler and an electrical contact positioned on a first longitudinal end thereof. A first guide post and a second guide post project outward along a longitudinal dimension of the toner container from the first longitudinal end of the body. The first guide post is spaced toward a first side of the body from the drive coupler, and the second guide post is spaced toward a second side of the body from the drive coupler. The first guide post and the second guide post overlap with the drive coupler along a vertical dimension of the toner container such that an imaginary horizontal plane intersects the first and second guide posts and the drive coupler. Bottom surfaces of the first and second guide posts may be positioned lower in the vertical dimension than a rotational axis of the drive coupler.

25 Claims, 18 Drawing Sheets

(56) References Cited

U.S. PATENT DOCUMENTS

| | | | | |
|---|---|---|---|---|
| 5,802,432 | A | | 9/1998 | Coffey et al. |
| 5,875,378 | A | * | 2/1999 | Campbell .......... G03G 15/0896 399/119 |
| 6,301,456 | B1 | | 10/2001 | Horrall et al. |
| 6,871,031 | B2 | | 3/2005 | Blaine et al. |
| 7,831,168 | B2 | | 11/2010 | Allen et al. |
| 8,200,126 | B2 | | 6/2012 | Chaudhuri et al. |
| 8,761,639 | B1 | | 6/2014 | Leemhuis et al. |
| 8,867,966 | B2 | | 10/2014 | Acosta et al. |
| 8,867,970 | B2 | | 10/2014 | Acosta et al. |
| 9,261,851 | B2 | | 2/2016 | Leemhuis et al. |
| 9,285,758 | B1 | | 3/2016 | Boettcher et al. |
| 9,291,940 | B1 | | 3/2016 | Abler et al. |
| 9,989,917 | B1 | | 6/2018 | Hale et al. |
| 10,073,410 | B1 | | 9/2018 | Bacon et al. |
| 10,175,643 | B1 | | 1/2019 | Carpenter et al. |
| 10,782,643 | B2 | | 9/2020 | Amann et al. |
| 10,809,661 | B1 | | 10/2020 | Carpenter et al. |
| 2002/0064401 | A1 | | 5/2002 | Ashikari |
| 2008/0310883 | A1 | | 12/2008 | Cho |
| 2011/0286771 | A1 | | 11/2011 | Taguchi et al. |
| 2016/0062271 | A1 | | 3/2016 | Leemhuis et al. |

* cited by examiner

TONER CARTRIDGE HAVING POSITIONING FEATURES

CROSS REFERENCES TO RELATED APPLICATIONS

This application claims priority to U.S. Provisional Patent Application Ser. No. 63/448,061, filed Feb. 24, 2023, entitled “Toner Container Having Positioning Features for Electrical Contacts,” U.S. Provisional Patent Application Ser. No. 63/449,643, filed Mar. 3, 2023, entitled “Toner Cartridge and Developer Unit Shutter Interface,” U.S. Provisional Patent Application Ser. No. 63/454,891, filed Mar. 27, 2023, entitled “Toner Container Having Positioning Features,” and U.S. Provisional Patent Application Ser. No. 63/472,849, filed Jun. 14, 2023, entitled “Toner Container Having Positioning Features.”

BACKGROUND

1. Field of the Disclosure

The present disclosure relates generally to image forming devices and more particularly to a toner container having positioning features.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device’s toner supply is typically stored in one or more replaceable units having a shorter lifespan than the image forming device. It is important that the replaceable units are precisely aligned within the image forming device. If the replaceable units are misaligned, toner ports may not seal properly, resulting in severe toner leakage, which can cause mechanical and print quality defects. Misalignment of the replaceable units may also cause one or more drive couplers of each replaceable unit to fail to properly mate with corresponding drive couplers in the image forming device, rendering rotatable components of the replaceable units inoperable, for example, to move toner. If the replaceable units are misaligned, the replaceable units may also fail to establish or maintain an electrical connection with the image forming device, preventing or interrupting electronics on the replaceable units from communicating with the image forming device and/or preventing or interrupting electrophotographic components, such as developer rolls, photoconductive drums, etc., from receiving a voltage from the image forming device’s power supply required for the electrophotographic printing process. It is often desired for the replaceable units to be rigidly held in place after installation in the image forming device in order to prevent their positional alignment from being disturbed during operation. The requirement for tight positional control must be balanced with the need to permit a user to easily load and unload the replaceable units into and out of the image forming device. Accordingly, it will be appreciated that precise alignment of the replaceable units and relatively simple insertion and removal into and out of the image forming device is desired.

SUMMARY

A toner container for use in an image forming device according to one example embodiment includes a body having a top, a bottom, a first side and a second side positioned between a first longitudinal end and a second longitudinal end of the body. A longitudinal dimension of the toner container that is orthogonal to a vertical dimension of the toner container extends between the first longitudinal end of the body and the second longitudinal end of the body. The body has a reservoir for holding toner. An outlet port is positioned on the bottom of the body for exiting toner from the toner container. The outlet port is positioned closer to the first longitudinal end of the body than to the second longitudinal end of the body. A drive coupler is positioned on the first longitudinal end of the body for mating with a corresponding drive coupler in the image forming device when the toner container is installed in the image forming device for receiving rotational motion from the corresponding drive coupler in the image forming device. An electrical contact is positioned on the first longitudinal end of the body for contacting a corresponding electrical contact in the image forming device when the toner container is installed in the image forming device. The electrical contact of the toner container is positioned higher in the vertical dimension of the toner container than the drive coupler of the toner container. A first guide post and a second guide post project outward along the longitudinal dimension of the toner container from the first longitudinal end of the body. The first guide post is spaced toward the first side of the body from the drive coupler of the toner container, and the second guide post is spaced toward the second side of the body from the drive coupler of the toner container. The first guide post and the second guide post overlap with the drive coupler of the toner container along the vertical dimension of the toner container such that an imaginary horizontal plane intersects the first and second guide posts and the drive coupler of the toner container.

Embodiments include those wherein the first guide post is positioned closer to the first side of the body than to the second side of the body, and the second guide post is positioned closer to the second side of the body than to the first side of the body. In some embodiments, the first guide post is spaced along a side-to-side dimension of the toner container that is orthogonal to the longitudinal dimension of the toner container and the vertical dimension of the toner container from the first side of the body, and the second guide post is spaced along the side-to-side dimension of the toner container from the second side of the body.

In some embodiments, a bottom surface of the first guide post and a bottom surface of the second guide post are positioned lower in the vertical dimension of the toner container than a rotational axis of the drive coupler of the toner container.

Embodiments include those wherein the first guide post and the second guide post are positioned equidistant from a rotational axis of the drive coupler of the toner container along a side-to-side dimension of the toner container that is orthogonal to the longitudinal dimension of the toner container and the vertical dimension of the toner container and that extends between the first side of the body and the second side of the body.

Some embodiments include a third guide post and a fourth guide post at the top of the body and near the first longitudinal end of the body. The third guide post and the fourth guide post project outward along the side-to-side dimension of the toner container. The third guide post projects toward the first side of the body, and the fourth guide post projects toward the second side of the body. Bottom surfaces of the third and fourth guide posts are unobstructed to contact and ride along top surfaces of corresponding guides in the image forming device during insertion of the toner container into the image forming device for controlling a position of the first longitudinal end of the body along the vertical dimension of the toner container during insertion of the toner container into the image forming device. In some embodiments, the third and fourth guide posts are positioned closer to the first longitudinal end of the body than the outlet port is to the first longitudinal end of the body.

Some embodiments include a first guide rail and a second guide rail at the top of the body. The first and second guide rails extend along the longitudinal dimension of the toner container and project outward along the side-to-side dimension of the toner container. The first guide rail projects toward the first side of the body, and the second guide rail projects toward the second side of the body. The third and fourth guide posts are positioned at front ends of the first and second guide rails and project further outward along the side-to-side dimension of the toner container than the first and second guide rails. Bottom surfaces of the first and second guide rails are unobstructed to contact and ride along the top surfaces of the corresponding guides in the image forming device during insertion of the toner container into the image forming device for controlling a position of the toner container along the vertical dimension of the toner container during insertion of the toner container into the image forming device.

Some embodiments include a primarily vertical wall positioned immediately below each of the first and second guide rails. The primarily vertical walls are inset from outer edges of the first and second guide rails, respectively, and the primarily vertical walls taper in the side-to-side dimension of the toner container along the longitudinal dimension of the toner container. A rib extends outward along the side-to-side dimension of the toner container from each primarily vertical wall. The first and second guide rails extend further outward along the side-to-side dimension of the toner container than the ribs. The ribs protrude further relative to the primarily vertical walls near one of the first and second longitudinal ends of the body than near the other of the first and second longitudinal ends of the body such that an outer surface of each rib has a constant position in the side-to-side dimension of the toner container along the longitudinal dimension of the toner container for limiting an extent of travel of the toner container along the side-to-side dimension of the toner container during insertion of the toner container into the image forming device.

Some embodiments include a datum point at a respective rear end of each of the first and second guide rails for controlling a position of the second longitudinal end of the body along the vertical dimension of the toner container when the toner container is installed in the image forming device. Bottom surfaces of the datum points extend lower along the vertical dimension of the toner container than bottom surfaces of the first and second guide rails.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container that is orthogonal to a vertical dimension of the toner container extends between the first longitudinal end of the body and the second longitudinal end of the body. A side-to-side dimension of the toner container that is orthogonal to the longitudinal dimension of the toner container and the vertical dimension of the toner container extends between the first side of the body and the second side of the body. The body has a reservoir for holding toner. An outlet port is positioned on the bottom of the body for exiting toner from the toner container. The outlet port is positioned closer to the first longitudinal end of the body than to the second longitudinal end of the body. A drive coupler is positioned on the first longitudinal end of the body for mating with a corresponding drive coupler in the image forming device when the toner container is installed in the image forming device for receiving rotational motion from the corresponding drive coupler in the image forming device. An electrical contact is positioned on the first longitudinal end of the body for contacting a corresponding electrical contact in the image forming device when the toner container is installed in the image forming device. The electrical contact of the toner container is electrically connected to processing circuitry on the toner container. The electrical contact of the toner container is positioned higher in the vertical dimension of the toner container than the drive coupler of the toner container. A first guide post and a second guide post project outward along the longitudinal dimension of the toner container from the first longitudinal end of the body for controlling a position of the first longitudinal end of the body along the vertical dimension of the toner container and the side-to-side dimension of the toner container when the toner container is installed in the image forming device and the first and second guide posts are received by corresponding first and second guide slots in the image forming device. The first guide post is positioned closer to the first side of the body than to the second side of the body, and the second guide post is positioned closer to the second side of the body than to the first side of the body. The first guide post is positioned closer to the first side of the body than the drive coupler of the toner container is to the first side of the body, and the second guide post is positioned closer to the second side of the body than the drive coupler of the toner container is to the second side of the body. A bottom surface of the first guide post and a bottom surface of the second guide post are positioned lower in the vertical dimension of the toner container than a rotational axis of the drive coupler of the toner container and higher in the vertical dimension of the toner container than a bottom end of the drive coupler of the toner container.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container that is orthogonal to a vertical dimension of the toner container extends between the first longitudinal end of the body and the second longitudinal end of the body. A side-to-side dimension of the toner container that is orthogonal to the longitudinal dimension of the toner container and the vertical dimension of the toner container extends between the first side of the body and the second side of the body. The body has a reservoir for holding toner. The toner container includes an outlet port for exiting toner from the toner container. A drive coupler is positioned on the first longitudinal end of the body for mating with a corresponding drive coupler in the image forming device when the toner container is installed in the image forming device for receiving rotational motion from the corresponding drive coupler in the image forming device. A first guide post and a second guide post project outward along the longitudinal dimension of the toner container from the first longitudinal end of the body for controlling a position of the first longitudinal end of the body along the vertical dimension of the toner container and the side-to-side dimension of the toner container when the toner container is installed in the image forming device and the first and second guide posts are received by corresponding first and second guide slots in the image forming device. The first guide post is positioned closer to the first side of the body than to the second side of the body, and the second guide post is positioned closer to the second side of the body than to the first side of the body. A bottom surface of the first guide post and a bottom surface of the second guide post are positioned lower in the vertical dimension of the toner container than a rotational axis of the drive coupler of the toner container and higher in the vertical dimension of the toner container than a bottom end of the drive coupler of the toner container. The first guide post and the second guide post are positioned equidistant from the rotational axis of the drive coupler of the toner container along the side-to-side dimension of the toner container.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
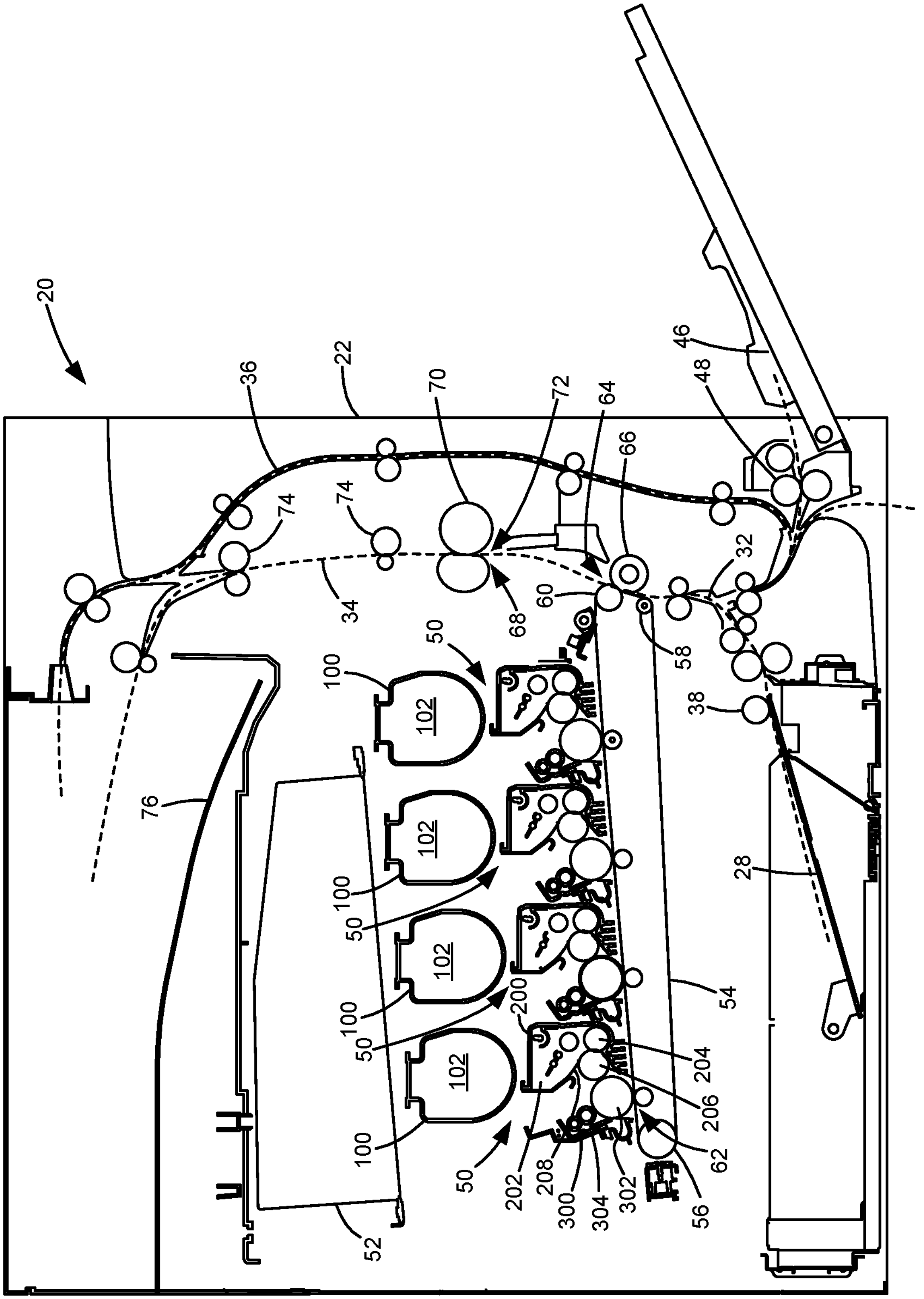
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color or type of toner contained therein.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade 208, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2:
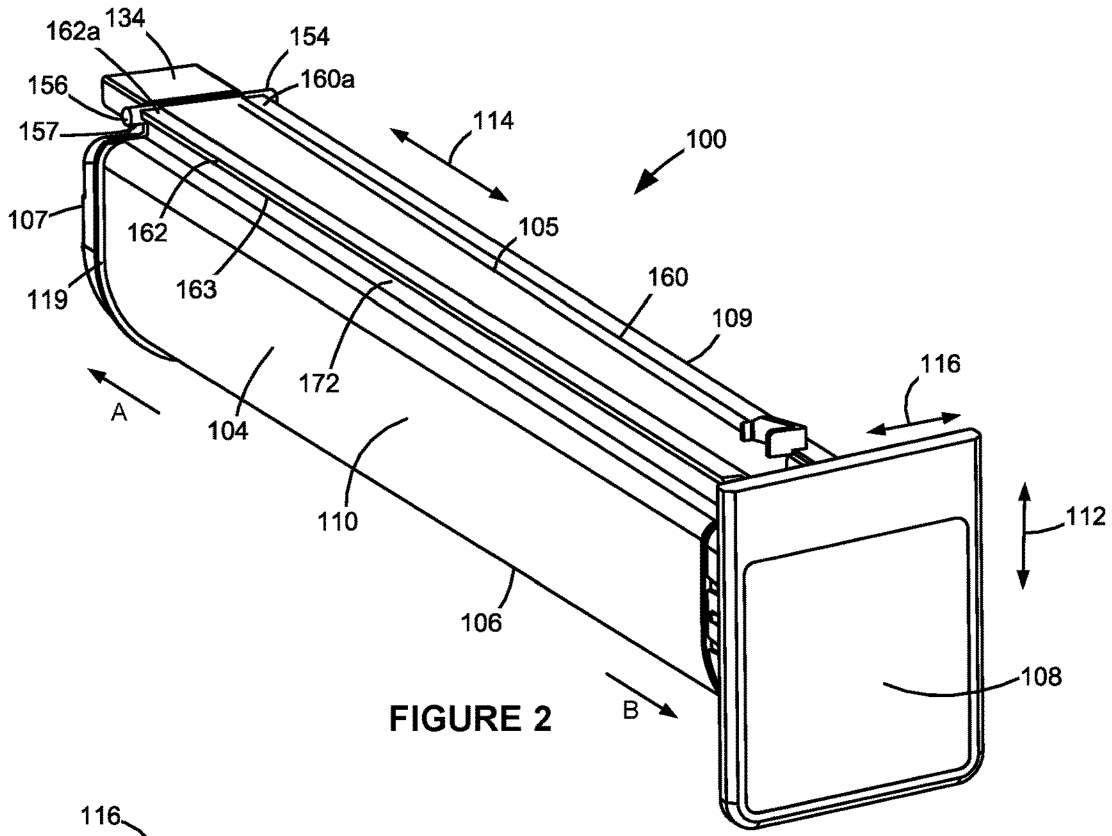
FIGS. 2-5 are perspective views of a toner cartridge according to one example embodiment.
Figure 3:
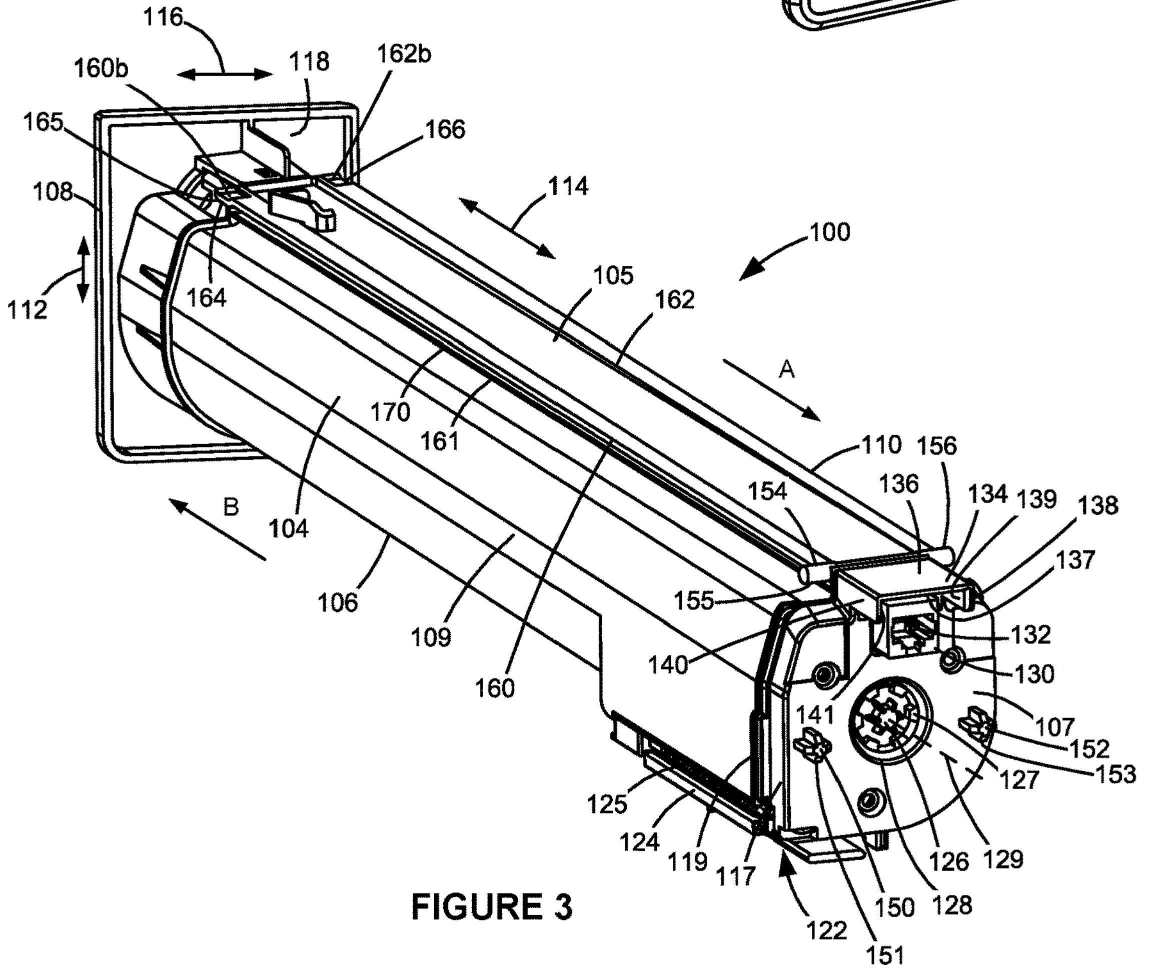

FIGS. 2 and 3 show toner cartridge 100 according to one example embodiment. Toner cartridge 100 includes a body 104 housing toner reservoir 102 therein. Body 104 includes a top 105, a bottom 106, a front end 107, a rear end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between front end 107 and rear end 108, and a width measured along a side-to-side dimension 116 of toner cartridge 100 orthogonal to vertical dimension 112 and longitudinal dimension 114 between side 109 and side 110. In the example embodiment illustrated, each end 107, 108 of body 104 includes a respective end cap 117, 118 mounted on a corresponding end wall, such as by suitable fasteners (e.g., screws, rivets, etc.) or by a snap-fit engagement. In this embodiment, end wall 119 at front end 107 and an end wall (not shown) at rear end 108 along with top 105, bottom 106 and sides 109, 110 form toner reservoir 102. In the example embodiment illustrated, toner cartridge 100 is inserted into image forming device 20 generally along longitudinal dimension 114 in the direction indicated by arrow A in FIGS. 2 and 3 with front end 107 of body 104 leading and rear end 108 of body 104 trailing, and toner cartridge 100 is removed from image forming device 20 generally along longitudinal dimension 114 in the direction indicated by arrow B in FIGS. 2 and 3 with rear end 108 of body 104 leading and front end 107 of body 104 trailing.

As used herein, the terms “front” and “rear” correspond to the direction of travel of toner cartridge 100 during insertion of toner cartridge 100 into image forming device 20 rather than any particular orientation of image forming device 20. For example, in one embodiment, image forming device 20 is primarily operated, for example, accessing a user interface, media tray(s), supply item(s) (such as toner cartridge 100, developer unit 200, and PC unit 300) and other features of image forming device 20, at a side proximate to rear end 108 of body 104 of toner cartridge 100.

Toner cartridge 100 includes an outlet port 122 for transferring toner to an inlet port of developer unit 200. In the example embodiment illustrated, outlet port 122 is formed as a downward facing opening on bottom 106 of body 104, next to front end 107 of body 104, such as next to an inner side of end wall 119. In the example embodiment illustrated, outlet port 122 is positioned closer to side 109 of body 104 than to side 110 of body 104. Outlet port 122 may include a shutter 124 that regulates whether toner is permitted to flow from reservoir 102 out of outlet port 122. In the example embodiment illustrated, shutter 124 is biased toward a closed position blocking toner from exiting outlet port 122 by a biasing member, such as an extension spring 125. Installation of toner cartridge 100 into image forming device 20 moves shutter 124 from the closed position to an open position permitting toner to exit outlet port 122.

Toner cartridge 100 also includes a drive coupler 126 that mates with and receives rotational power from a corresponding drive coupler in image forming device 20 when toner cartridge 100 is installed in image forming device 20 in order to provide rotational power to various rotatable components of toner cartridge 100, such as toner agitators positioned within reservoir 102 for moving toner to outlet port 122. In the example embodiment illustrated, drive coupler 126 is positioned on front end 107 of body 104, for example, higher than outlet port 122. In the embodiment illustrated, drive coupler 126 is positioned on an outer surface of end wall 119 and exposed through an opening 128 in end cap 117 such that drive coupler 126 is unobstructed to mate with the corresponding drive coupler in image forming device 20 when toner cartridge 100 is installed in image forming device 20. In the embodiment illustrated, drive coupler 126 mates with the corresponding drive coupler in image forming device 20 at an axial end portion 127 of drive coupler 126 when toner cartridge 100 is installed in image forming device 20.

Toner cartridge 100 includes an electrical connector 130 having electrical contacts 132 that are matable with corresponding electrical contacts in image forming device 20 when toner cartridge 100 is installed in image forming device 20 for facilitating a communication link between processing circuitry of toner cartridge 100 and a controller of image forming device 20. The processing circuitry of toner cartridge 100 is electrically connected to electrical contacts 132 and may provide authentication functions, safety and operational interlocks, operating parameters and/or usage information related to toner cartridge 100. The processing circuitry of toner cartridge 100 may include hardware and/or software logic, as desired. For example, the processing circuitry of toner cartridge 100 may include an application-specific integrated circuit (ASIC) and/or a microprocessor or the like as well as accompanying memory, for example, non-volatile and/or volatile memory, as desired.

In the example embodiment illustrated, electrical connector 130 and electrical contacts 132 are positioned on front end 107 of body 104. In this embodiment, electrical contacts 132 are unobstructed on front end 107 to mate with corresponding electrical contacts in image forming device 20 when toner cartridge 100 is installed in image forming device 20. In the example embodiment illustrated, electrical connector 130 and electrical contacts 132 are positioned higher than drive coupler 126, near top 105 of housing 104. In this embodiment, electrical connector 130 and electrical contacts 132 are vertically aligned with drive coupler 126, as illustrated in FIG. 3, such that an imaginary vertical plane intersects electrical connector 130 and drive coupler 126 and respective imaginary vertical planes intersect each electrical contact 132 and drive coupler 126.

In the example embodiment illustrated, toner cartridge 100 also includes an alignment guide 134 that contacts a corresponding electrical connector in image forming device 20 during insertion of toner cartridge 100 into image forming device 20 in order to move the corresponding electrical connector in image forming device 20 into alignment with electrical connector 130 of toner cartridge 100. Alignment guide 134 is positioned on front end 107 of body 104 in this embodiment. Alignment guide 134 may be positioned at top 105 of body 104. In the example embodiment illustrated, alignment guide 134 is positioned above electrical connector 130 and electrical contacts 132. In the example embodiment illustrated, alignment guide 134 is vertically aligned with electrical connector 130 and electrical contacts 132 such that an imaginary vertical plane intersects alignment guide 134 and electrical connector 130. Alignment guide 134 extends forward, for example, in a cantilevered manner, from front end 107 of body 104 along longitudinal dimension 114 in the direction of insertion A of toner cartridge 100 into image forming device 20. Alignment guide 134 extends further forward along longitudinal dimension 114 than electrical contacts 132 in order to contact the corresponding electrical connector in image forming device 20 prior to electrical connector 130 contacting the corresponding electrical connector in image forming device 20 during insertion of toner cartridge 100 into image forming device 20. In the example embodiment illustrated, alignment guide 134 is formed integrally with end cap 117.

In the example embodiment illustrated, alignment guide 134 includes an awning projecting along longitudinal dimension 114 from front end 107 of body 104. In this embodiment, alignment guide 134 includes an upper ledge or guide member 136 having a bottom contact surface 137 positioned to contact the corresponding electrical connector in image forming device 20 during insertion of toner cartridge 100 into image forming device 20 in order to align the corresponding electrical connector in image forming device with electrical connector 130 along vertical dimension 112. Bottom contact surface 137 faces downward, toward electrical connector 130 and electrical contacts 132. In this embodiment, bottom contact surface 137 of upper guide member 136 is positioned higher than electrical connector 130 and electrical contacts 132. In the example embodiment illustrated, upper guide member 136 is formed as a substantially horizontal projection from front end 107 above electrical connector 130 and electrical contacts 132.

In the example embodiment illustrated, alignment guide 134 includes a first side ledge or guide member 138 and may include a second side ledge or guide member 140. Each side guide member 138, 140 includes a respective inner side contact surface 139, 141. Each inner side contact surface 139, 141 faces toward an opposite side 109, 110 of body 104 along side-to-side dimension 116 with inner side contact surfaces 139, 141 facing toward each other. In the example embodiment illustrated, inner side contact surface 139 of side guide member 138 is positioned closer to side 110 of body 104 than to side 109 of body 104, and inner side contact surface 141 of side guide member 140 is positioned closer to side 109 of body 104 than to side 110 of body 104. In this embodiment, inner side contact surface 139 of side guide member 138 is positioned closer to side 110 of body 104 than electrical connector 130 and electrical contacts 132 are to side 110 of body 104, and inner side contact surface 141 of side guide member 140 is positioned closer to side 109 of body 104 than electrical connector 130 and electrical contacts 132 are to side 109 of body 104.

Inner side contact surface 139 of side guide member 138 is positioned to contact the corresponding electrical connector in image forming device 20 during insertion of toner cartridge 100 into image forming device 20 in order to align the corresponding electrical connector in image forming device 20 with electrical connector 130 along side-to-side dimension 116. In the example embodiment illustrated, side guide member 140 provides symmetry and structural support for upper guide member 136. Inner side contact surface 141 of side guide member 140 may also help prevent overtravel of the corresponding electrical connector in image forming device 20 during mating with electrical connector 130. In the example embodiment illustrated, each side guide member 138, 140 is formed as a substantially vertical projection from front end 107 that extends downward from upper guide member 136.

Figure 4:
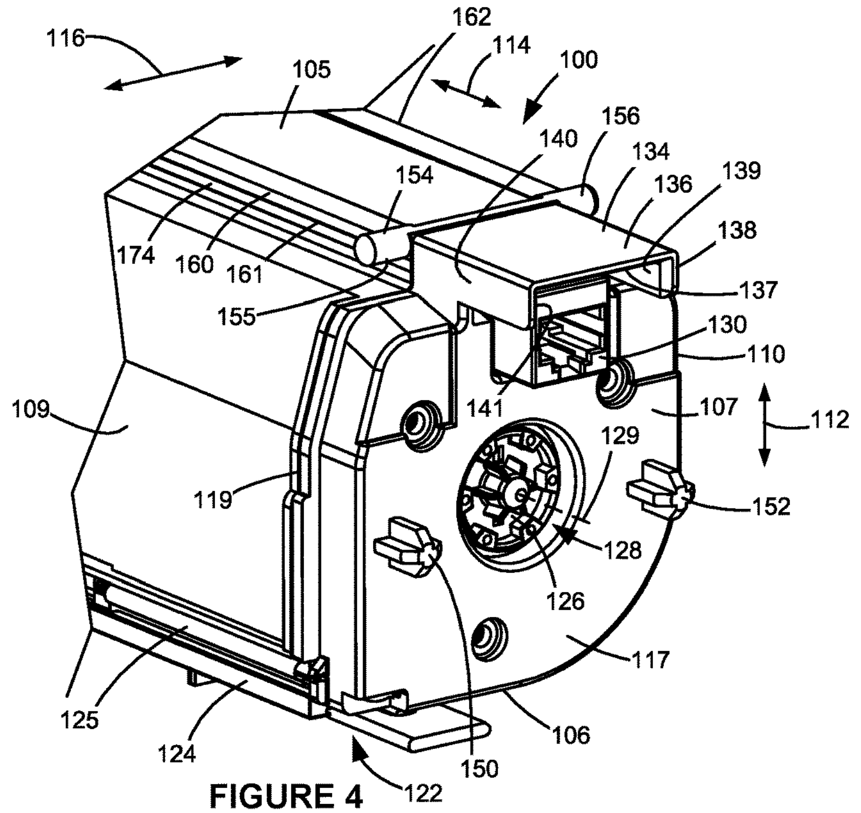

With reference to FIGS. 3 and 4, in some embodiments, toner cartridge 100 includes one or more guide posts on front end 107 of body 104. For example, in the embodiment illustrated, toner cartridge 100 includes a pair of guide posts 150, 152 on front end 107 of body 104. In the example embodiment illustrated, posts 150, 152 are formed integrally with end cap 117; however, in other embodiments, posts 150, 152 may be formed by any suitable means, including, for example, integrally with end wall 119 or separately attached to end cap 117, end wall 119 or another portion of body 104. In the example embodiment illustrated, posts 150, 152 project from front end 107 of body 104 along longitudinal dimension 114 of toner cartridge 100, in the direction of insertion A of toner cartridge 100 into image forming device 22, away from rear end 108 of body 104. In this embodiment, posts 150, 152 are formed as cantilevered extensions from front end 107 of body 104 (e.g., from end cap 117). In the example embodiment illustrated, post 150 is positioned closer to side 109 of body 104 than to side 110 of body 104, and post 150 is positioned closer to side 109 of body 104 than post 152, drive coupler 126 and electrical contacts 132 are to side 109 of body 104. In this embodiment, post 152 is positioned closer to side 110 of body 104 than to side 109 of body 104, and post 152 is positioned closer to side 110 of body 104 than post 150, drive coupler 126 and electrical contacts 132 are to side 110 of body 104. In some embodiments, posts 150, 152 are positioned equidistant from a rotational axis 129 of drive coupler 126 as measured along side-to-side dimension 116 of toner cartridge 100. In some embodiments, posts 150, 152 are spaced inward from sides 109, 110 of body 104, such as sides 109, 110 of end cap 117, along side-to-side dimension 116. In the example embodiment illustrated, posts 150, 152 are positioned lower than electrical connector 130, electrical contacts 132 and alignment guide 134 and higher than outlet port 122. In this embodiment, posts 150, 152 overlap with drive coupler 126 along vertical dimension 112 of toner cartridge 100 such that an imaginary horizontal plane intersects posts 150, 152 and drive coupler 126. In some embodiments, a bottom surface 151, 153 of each post 150, 152 is positioned lower than rotational axis 129 of drive coupler 126 and higher than a bottom end of drive coupler 126. In the example embodiment illustrated, each post 150, 152 has a cross or X-shaped cross section; however, other shapes, for example, a circular or square cross section, may be used, as desired.

As discussed in greater detail below, posts 150, 152 are received by corresponding guide slots in a frame of image forming device 20 when toner cartridge 100 is fully installed in image forming device 20. The engagement between posts 150, 152 and the corresponding guide slots in image forming device 20 control the position of front end 107 of body 104 of toner cartridge 100 along vertical dimension 112 of toner cartridge 100 and side-to-side dimension 116 of toner cartridge 100 when toner cartridge 100 is fully installed in image forming device 20 in order to align various interface features of toner cartridge 100 positioned at or near front end 107 of body 104, including outlet port 122, drive coupler 126, electrical connector 130, including electrical contacts 132, and alignment guide 134, with corresponding features in image forming device 20 during operation as discussed in greater detail below.

With reference to FIGS. 2-4, in the example embodiment illustrated, toner cartridge 100 includes a pair of guide posts 154, 156 that project outward, for example, in a cantilevered manner, in opposite directions along side-to-side dimension 116 of toner cartridge 100 at top 105 of body 104 and near front end 107 of body 104. Post 154 extends along side-to-side dimension 116 toward side 109 of body 104, and post 156 extends along side-to-side dimension 116 toward side 110 of body 104. In the embodiment illustrated, posts 154, 156 are positioned closer to front end 107 of body than outlet port 122 is to front end 107 of body 104. For example, in the embodiment illustrated, posts 154, 156 are positioned at end wall 119 of body 104. In other embodiments, posts 154, 156 may be positioned on end cap 117. In the example embodiment illustrated, posts 154, 156 are formed integrally with body 104 at end wall 119; however, in other embodiments, posts 154, 156 may be formed integrally with end cap 117 or separately attached to body 104, such as end cap 117, end wall 119 or another portion of body 104. In the example embodiment illustrated, each post 154, 156 has a circular cross section; however, other shapes may be used, as desired.

Each post 154, 156 includes a bottom contact surface 155, 157 that is unobstructed to contact and ride along the top surface of a corresponding guide rail that runs along the length of a cartridge slot that receives toner cartridge 100 in image forming device 20 during insertion of toner cartridge 100 into image forming device 20 and removal of toner cartridge 100 from image forming device 20 in order to guide front end 107 of toner cartridge 100 as discussed in greater detail below. Posts 154, 156 control the position of front end 107 of body 104 of toner cartridge 100 along vertical dimension 112 of toner cartridge 100 and side-to-side dimension 116 of toner cartridge 100 during insertion of toner cartridge 100 into image forming device 20 and removal of toner cartridge 100 from image forming device 20 as discussed in greater detail below.

With reference to FIGS. 2-5, in the example embodiment illustrated, toner cartridge 100 includes a pair of guide rails 160, 162 that extend along longitudinal dimension 114 of toner cartridge 100 at top 105 of body 104. In this embodiment, guide rails 160, 162 are formed as cantilevered extensions that extend outward in opposite directions along side-to-side dimension 116 of toner cartridge 100 at top 105 of body 104. Specifically, guide rail 160 extends along side-to-side dimension 116 toward side 109 of body 104, and guide rail 162 extends along side-to-side dimension 116 toward side 110 of body 104. In the example embodiment illustrated, guide rails 160, 162 run along nearly the entire length of body 104 of toner cartridge 100 along longitudinal dimension 114 of toner cartridge 100, from end wall 119 at front end 107 of body 104 to an inner end of end cap 118 at rear end 108 of body 104. In the example embodiment illustrated, guide rails 160, 162 are formed integrally with body 104; however, in other embodiments, guide rails 160, 162 may be separately attached to body 104. In the example embodiment illustrated, posts 154, 156 project outward in opposite directions along side-to-side dimension 116 of toner cartridge 100 at a front end **160*a*, 162*a* of each guide rail 160, 162. Posts 154, 156 extend further outward along side-to-side dimension 116 of toner cartridge 100 than guide rails 160, 162**.

Each guide rail 160, 162 includes a bottom contact surface 161, 163 that is positioned to contact and ride along the top surface of a corresponding guide rail positioned at an entrance of toner cartridge 100 to image forming device 20 during insertion of toner cartridge 100 into image forming device 20 and removal of toner cartridge 100 from image forming device 20 in order to guide toner cartridge 100 into and out of image forming device 20 as discussed in greater detail below. Guide rails 160, 162 help control the position of toner cartridge 100 along vertical dimension 112 of toner cartridge 100 during insertion of toner cartridge 100 into image forming device 20 and removal of toner cartridge 100 from image forming device 20 as discussed in greater detail below.

Figure 5:
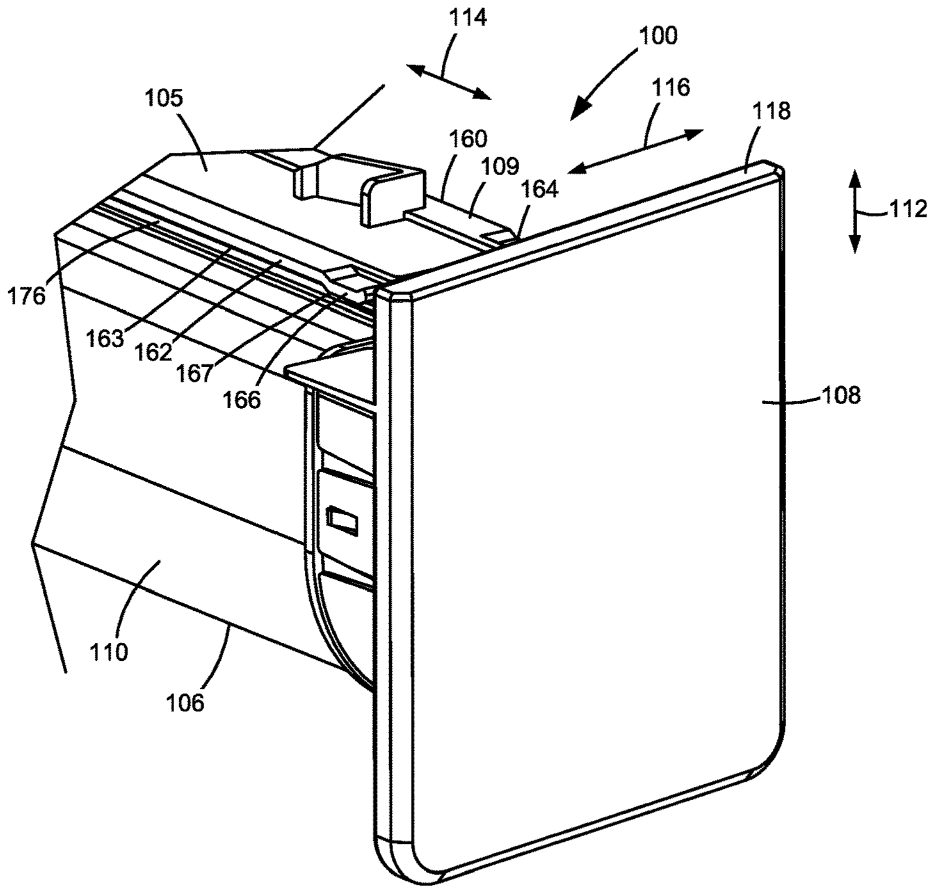

With reference to FIGS. 3 and 5, in the example embodiment illustrated, each guide rail 160, 162 includes a datum point 164, 166 at a respective rear end **160*b*, 162*b* of each guide rail 160, 162. In this embodiment, a bottom surface 165, 167 of each datum point 164, 166 extends lower along vertical dimension 112 of toner cartridge 100 than bottom surfaces 161, 163 of other portions of guide rails 160, 162, such as the rest of guide rails 160, 162. Datum points 164, 166 control the position of rear end 108 of body 104 of toner cartridge 100 along vertical dimension 112 of toner cartridge 100 when toner cartridge 100 is fully installed in image forming device 20** as discussed in greater detail below.

With reference to FIGS. 2-5, in the example embodiment illustrated, top 105, bottom 106 and sides 109, 110 of body 104 of toner cartridge 100 may be formed by injection molding, which typically requires draft along longitudinal dimension 114 of toner cartridge 100. In the embodiment illustrated, a generally vertical wall 170, 172 is positioned immediately below each guide rail 160, 162. Walls 170, 172 are inset from the outer edges of guide rails 160, 162. Due to the draft along longitudinal dimension 114 of toner cartridge 100, walls 170, 172 gradually taper in side-to-side dimension 116, inward toward each other in a direction from front end 107 of body 104 toward rear end 108 of body 104, along longitudinal dimension 114 of toner cartridge 100. In the example embodiment illustrated, one or more ribs 174, 176 extend outward along side-to-side dimension 116 of body 104 from each wall 170, 172. In this embodiment, guide rails 160, 162 extend further outward along side-to-side dimension 116 toward sides 109, 110 of body 104, respectively, than ribs 174, 176. Outer surfaces of ribs 174, 176 have a substantially constant position in side-to-side dimension 116 of toner cartridge 100 along the length of ribs 174, 176 such that ribs 174, 176 protrude further relative to walls 170, 172 near rear end 108 of body 104 than near front end 107 of body 104 due to the gradual taper of walls 170, 172. In this manner, ribs 174, 176 have substantially the same effective width as measured in side-to-side dimension 116 of toner cartridge 100 along the length of ribs 174, 176. As discussed in greater detail below, in the example embodiment illustrated, ribs 174, 176 help control the position of toner cartridge 100 along side-to-side dimension 116 of toner cartridge 100 during insertion of toner cartridge 100 into image forming device 20 and removal of toner cartridge 100 from image forming device 20 in a manner that provides substantially the same clearance along side-to-side dimension 116 of toner cartridge 100 during the entire insertion or removal process.

Figure 6:
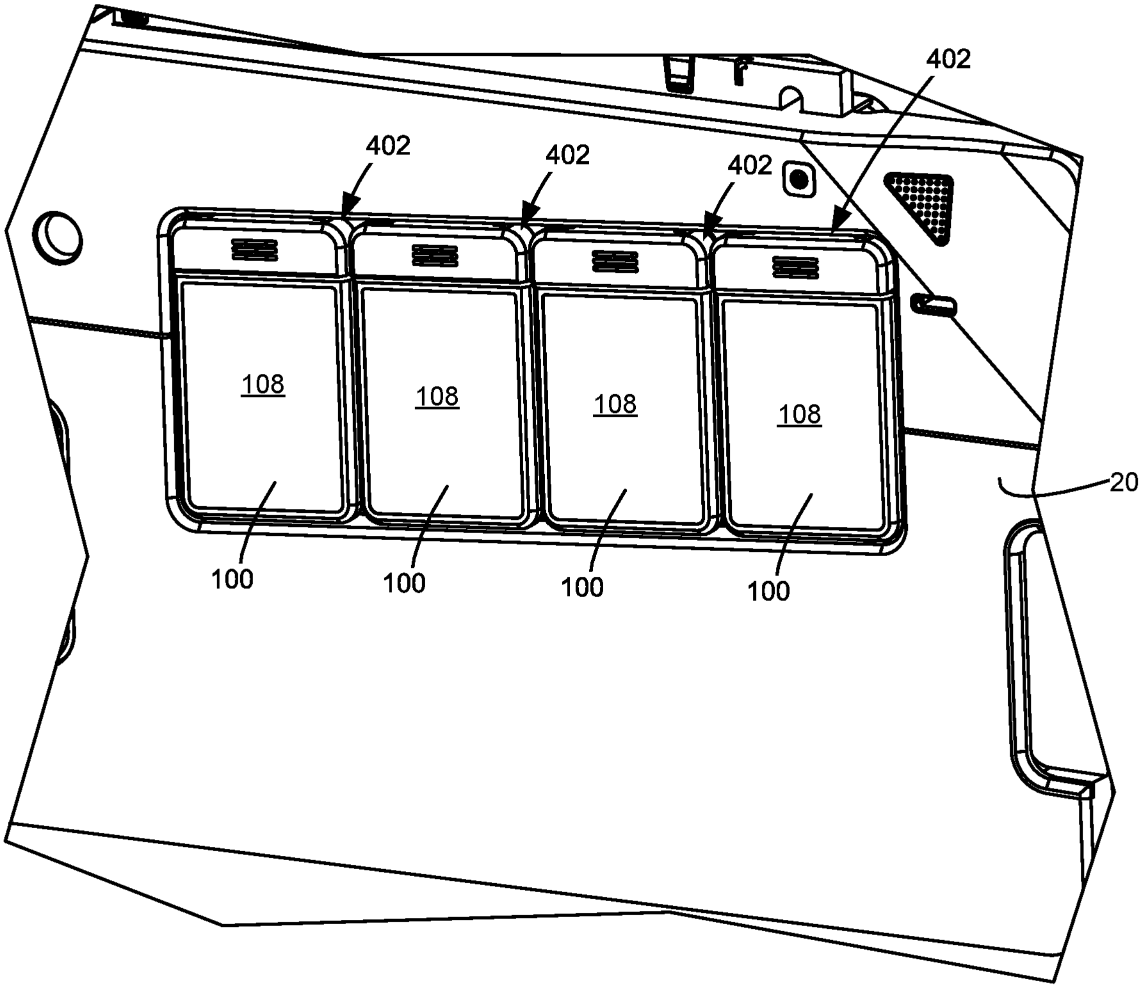
FIG. 6 is a perspective view of the image forming device with an access door of the image forming device in an open position showing four toner cartridges installed in the image forming device according to one example embodiment.

FIG. 6 shows image forming device 20 with an access door of image forming device 20 in an open position permitting a user to access toner cartridges 100 installed in image forming device 20. In the example embodiment illustrated, a rear end 108 of each toner cartridge 100 is exposed to the user when toner cartridges 100 are installed in image forming device 20 and the access door is in the open position. Each toner cartridge 100 is positioned in a corresponding cartridge slot 402 in image forming device 20.

Figure 7A:
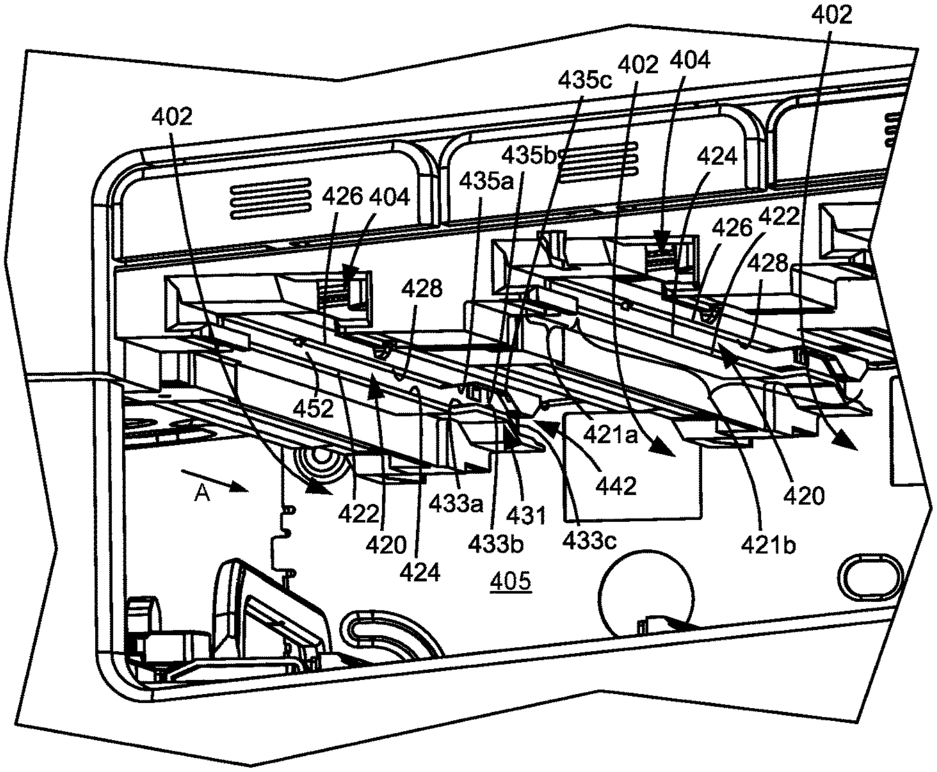
FIGS. 7A and 7B are perspective views of the image forming device with the access door of the image forming device in the open position and the toner cartridges removed from the image forming device showing a plurality of cartridge slots of the image forming device each positioned to receive a corresponding toner cartridge according to one example embodiment.
Figure 7B:
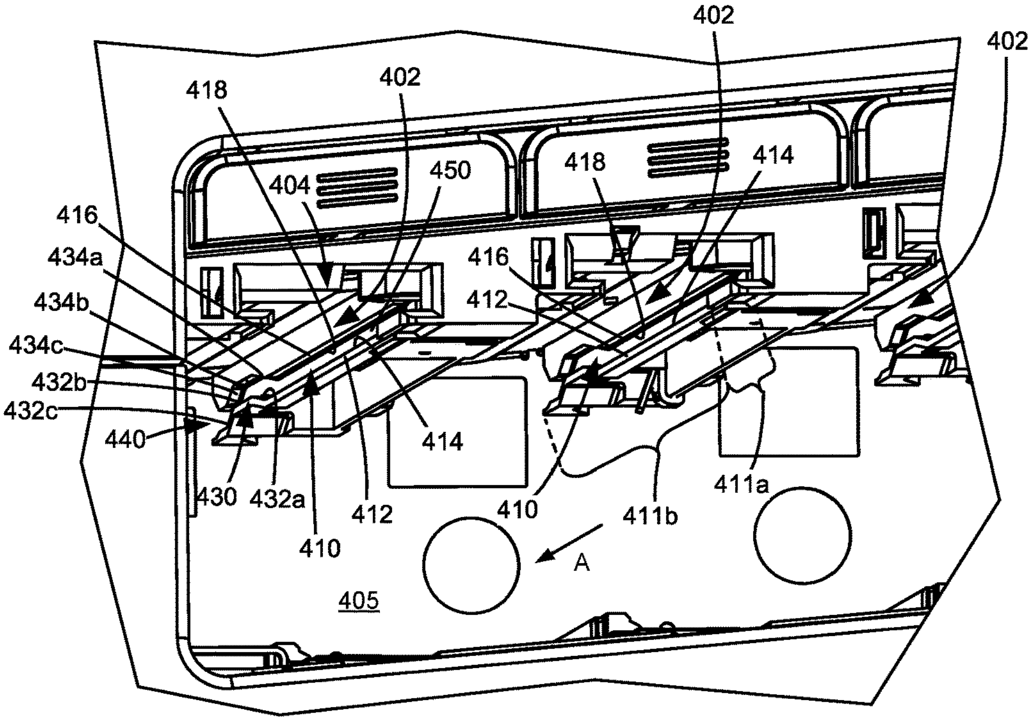

FIGS. 7A and 7B show cartridge slots 402 of image forming device 20 in greater detail according to one example embodiment. Each cartridge slot 402 is positioned to receive and retain a corresponding toner cartridge 100 in image forming device 20. Each cartridge slot 402 includes an entrance opening 404 permitting insertion of toner cartridges 100 into image forming device 20, with front end 107 of toner cartridge 100 leading, and removal of toner cartridges 100 from image forming device 20, with rear end 108 of toner cartridge 100 leading. When a toner cartridge 100 is in its final installed position in image forming device 20, rear end 108 of toner cartridge 100 is positioned proximate to entrance opening 404 of cartridge slot 402, and front end 107 of toner cartridge 100 is positioned proximate to a distal end 405 of cartridge slot 402 relative to entrance opening 404. Each cartridge slot 402 includes a pair of guide slots 410, 420 that receive corresponding guide posts 152, 154, respectively, of toner cartridge 100. Each guide slot 410, 420 includes a respective bottom guide 412, 422 having a top contact surface 414, 424 and a respective top guide 416, 426 having a bottom contact surface 418, 428.

Figure 8:
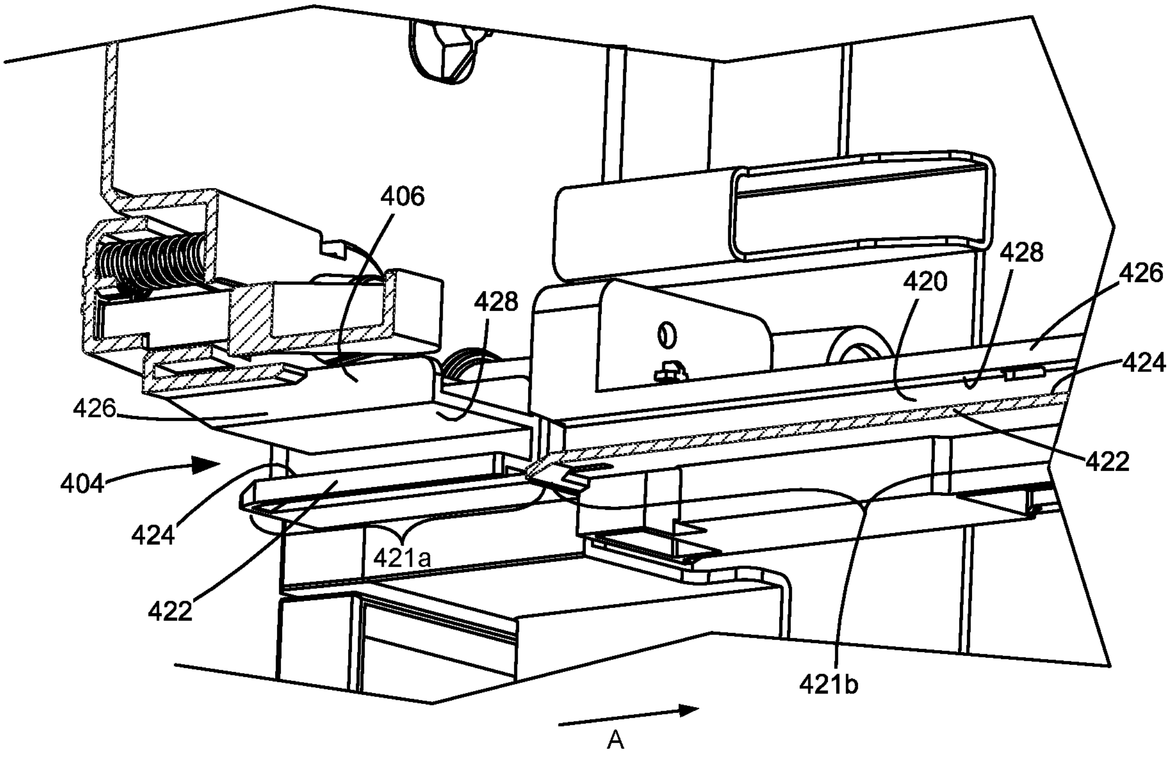
FIG. 8 is a perspective view of a guide slot formed in a cartridge slot of the plurality of cartridge slots of the image forming device according to one example embodiment.

With reference to FIGS. 7A, 7B and 8, in the example embodiment illustrated, each guide slot 410, 420 includes a first portion 411*a*, 421*a* and a second portion 411*b*, 421*b*. First portions 411*a*, 421*a* of guide slots 410, 420 are positioned proximate to entrance opening 404 of cartridge slot 402. In the example embodiment illustrated, first portions 411*a*, 421*a* of guide slots 410, 420 are formed on a cover 406 of image forming device 20 that is positioned inside of the access door of image forming device 20 and forms entrance openings 404 of cartridge slots 402. Second portions 411*b*, 421*b* of guide slots 410, 420 extend from first portions 411*a*, 421*a* of guide slots 410, 420 along the remaining lengths of guide slots 410, 420 to distal end 405 of cartridge slot 402. In the example embodiment illustrated, bottom guides 412, 422 and top guides 416, 426 of first portions 411*a*, 421*a* of guide slots 410, 420 protrude further along side-to-side dimension 116 of toner cartridge 100 than bottom guides 412, 422 and top guides 416, 426 of second portions 411*b*, 421*b* of guide slots 410, 420 such that guide posts 154, 156 of toner cartridge 100 are able to contact bottom guides 412, 422 and top guides 416, 426 of first portions 411*a*, 421*a* and second portions 411*b*. 421*b* of guide slots 410, 420, but guide rails 160, 162 of toner cartridge 100 are able to contact bottom guides 412, 422 and top guides 416, 426 of first portions 411*a*. 421*a* of guide slots 410, 420 but not second portions 411*b*. 421*b* of guide slots 410, 420, as discussed in greater detail below.

With reference to FIGS. 7A and 7B, in the example embodiment illustrated, each guide slot 410, 420 includes a raised section 430, 431 positioned proximate to distal end 405 of cartridge slot 402, in second portions 411*b*, 421*b* of guide slots 410, 420. Raised sections 430, 431 of guide slots 410, 420 are formed by bottom guides 412, 422 and top guides 416, 426 of guide slots 410, 420. Specifically, in the embodiment illustrated, top contact surfaces 414, 424 of bottom guides 412, 422 include an inclined portion 432*a*, 433*a* that is angled upward along the direction of insertion A of toner cartridge 100 into image forming device 20, a raised portion 432*b*, 433*b* that has a substantially constant height along the direction of insertion A of toner cartridge 100 into image forming device 20, and a declining portion 432*c*, 433*c* that is angled downward along the direction of insertion A of toner cartridge 100 into image forming device 20. Similarly, bottom contact surfaces 418, 428 of top guides 416, 426 include an inclined portion 434*a*, 435*a* that is angled upward along the direction of insertion A of toner cartridge 100 into image forming device 20, a raised portion 434*b*, 435*b* that has a substantially constant height along the direction of insertion A of toner cartridge 100 into image forming device 20, and a declining portion 434*c*, 435*c* that is angled downward along the direction of insertion A of toner cartridge 100 into image forming device 20.

In the example embodiment illustrated, each guide slot 410, 420 includes an enlarged portion 440, 442 at distal end 405 of cartridge slot 402 having an enlarged vertical gap between top contact surfaces 414, 424 of bottom guides 412, 422 and bottom contact surfaces 418, 428 of top guides 416, 426 relative to the portions of guide slots 410, 420 leading to distal end 405 of cartridge slot 404. Specifically, in this embodiment, top contact surfaces 414, 424 of bottom guides 412, 422 extend downward along the direction of insertion A of toner cartridge 100 into image forming device 20 at distal end 405 of cartridge slot 402, and bottom contact surfaces 418, 428 of top guides 416, 426 extend upward along the direction of insertion A of toner cartridge 100 into image forming device 20 at distal end 405 of cartridge slot 402.

Figure 9:
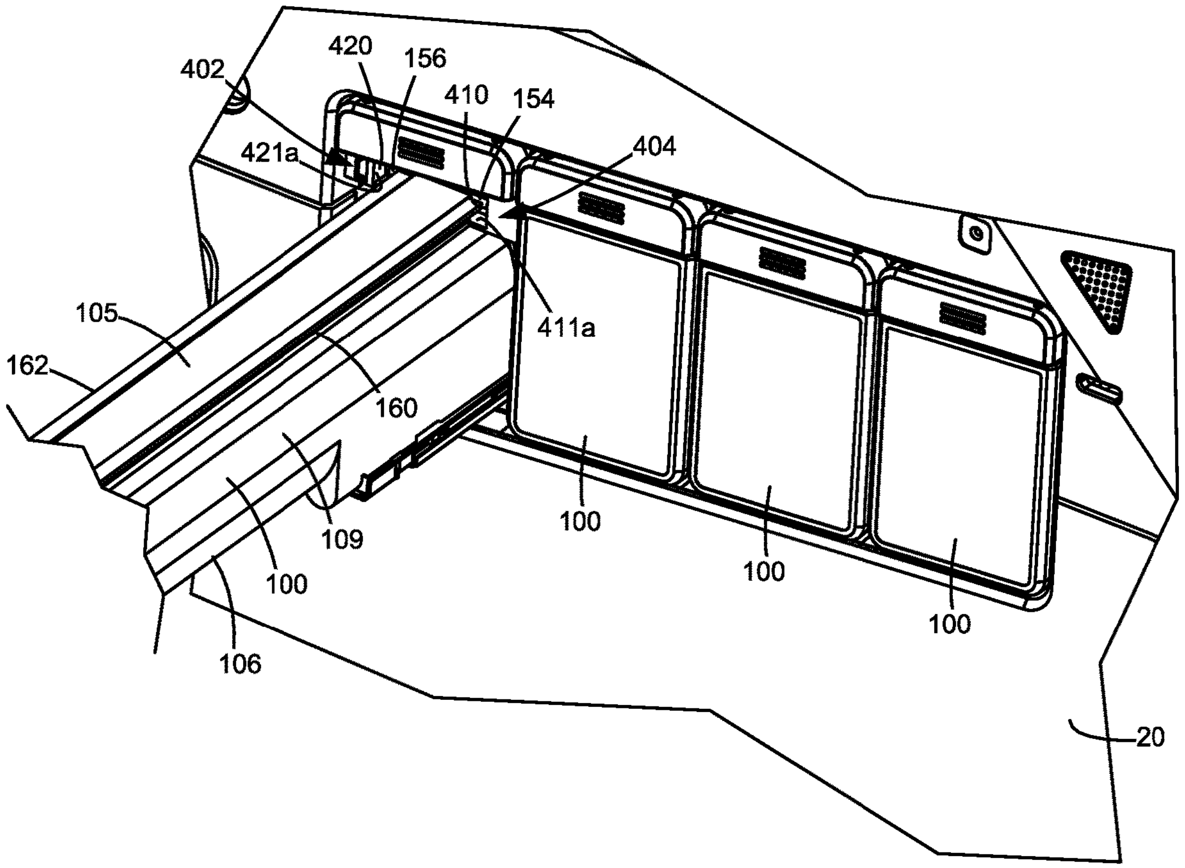
FIG. 9 is a perspective view of the image forming device with the access door of the image forming device in the open position showing the initial insertion of a toner cartridge into a corresponding cartridge slot of the image forming device according to one example embodiment.

FIG. 9 shows a toner cartridge 100 during initial insertion into a corresponding cartridge slot 402 of image forming device 20 with front end 107 of toner cartridge 100 leading in direction of insertion A. Guide posts 154, 156 are received by guide slots 410, 420, respectively. FIG. 9 shows guide posts 154, 156 entering first portions 411*a*, 421*a* of guide slots 410, 420. The engagement between guide posts 154, 156 and guide slots 410, 420 controls the vertical position of front end 107 of toner cartridge 100 during insertion of toner cartridge 100 into image forming device 20. Specifically, contact between bottom contact surfaces 155, 157 of guide posts 154, 156 and top contact surfaces 414, 424 of bottom guides 412, 422 of guide slots 410, 420 limits downward movement of front end 107 of toner cartridge 100 and generally controls the vertical position of front end 107 of toner cartridge 100 during insertion of toner cartridge 100 into image forming device 20. Bottom contact surfaces 418, 428 of top guides 416, 426 of guide slots 410, 420 limit upward movement of guide posts 154, 156 of toner cartridge 100 in order to limit upward movement of front end 107 of toner cartridge 100 during insertion of toner cartridge 100 into image forming device 20. Side surfaces 450, 452 (FIGS. 7A and 7B) of guide slots 410, 420 formed between top contact surfaces 414, 424 of bottom guides 412, 422 and bottom contact surfaces 418, 428 of top guides 416, 426 limit side-to-side movement of guide posts 154, 156 in order to limit side-to-side movement of front end 107 of toner cartridge 100 during insertion of toner cartridge 100 into image forming device 20.

Figure 10A:
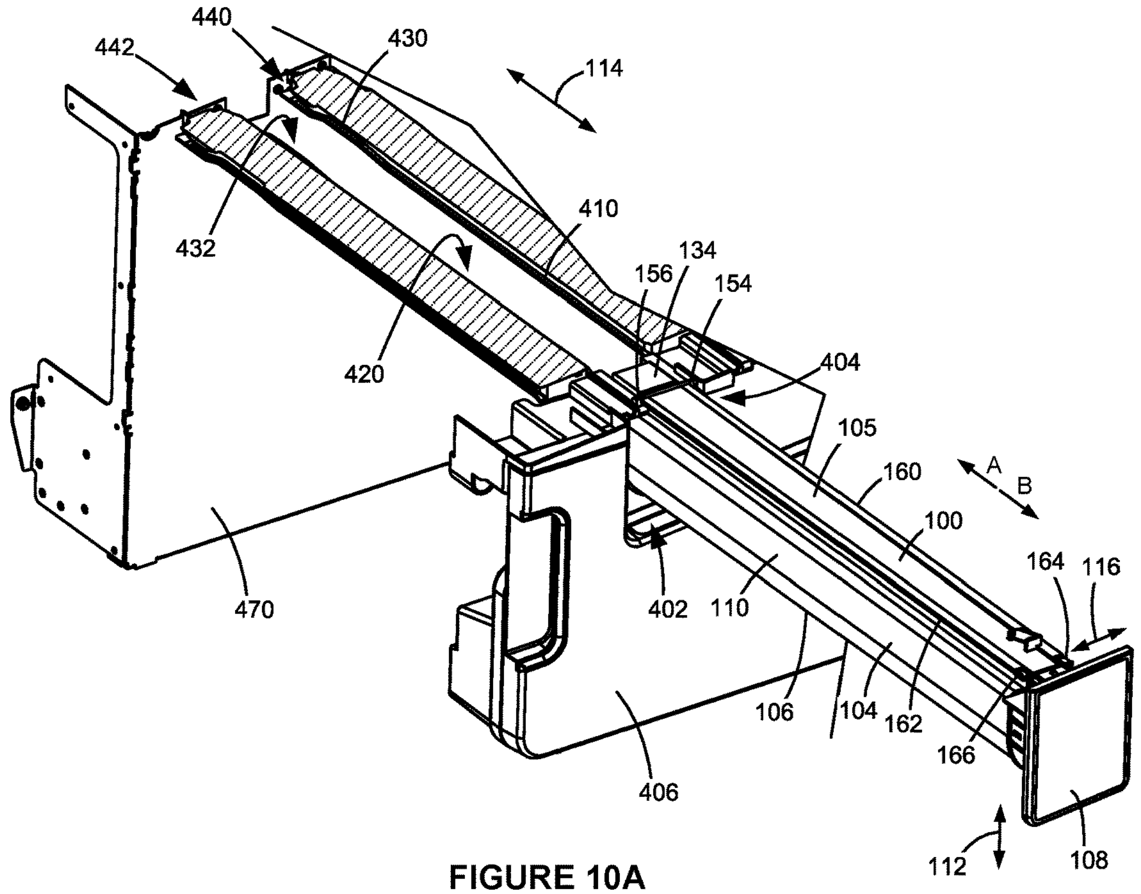
FIGS. 10A-10F are sequential schematic perspective views showing the insertion of a toner cartridge into a corresponding cartridge slot of the image forming device according to one example embodiment.
Figure 10B:
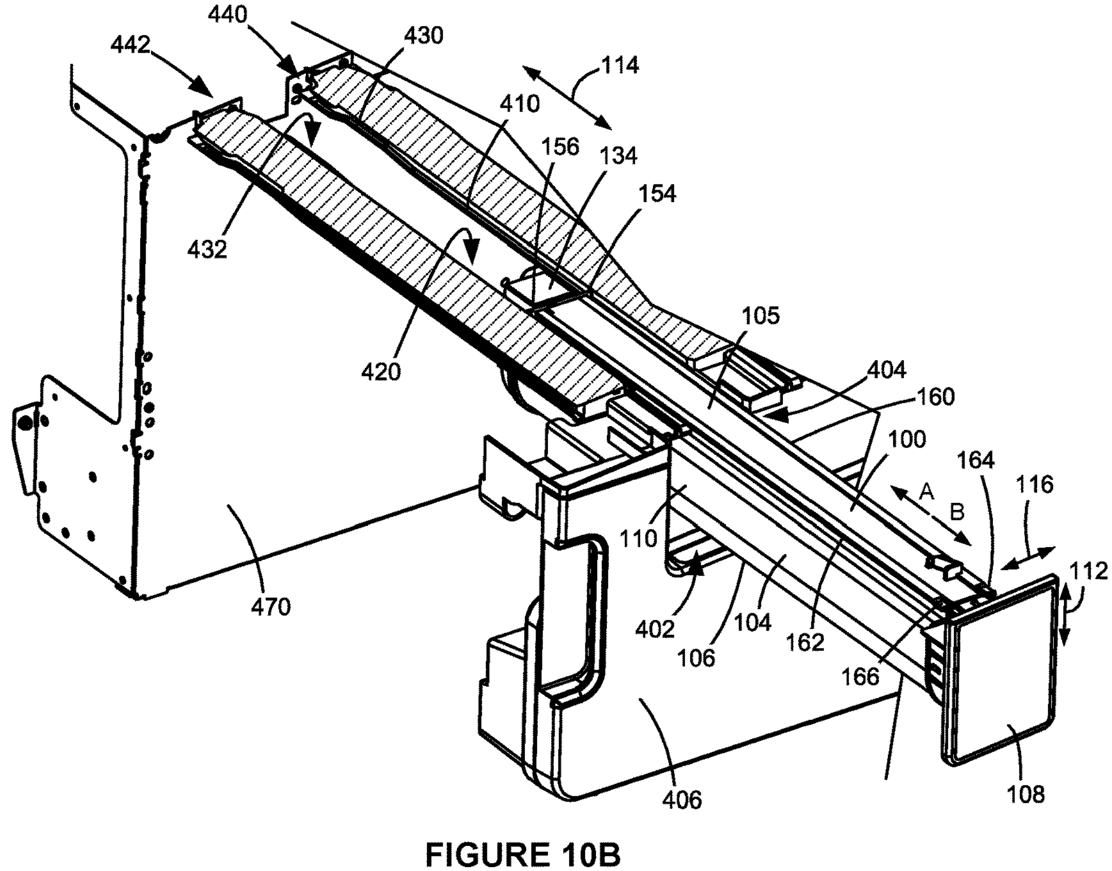
Figure 10C:
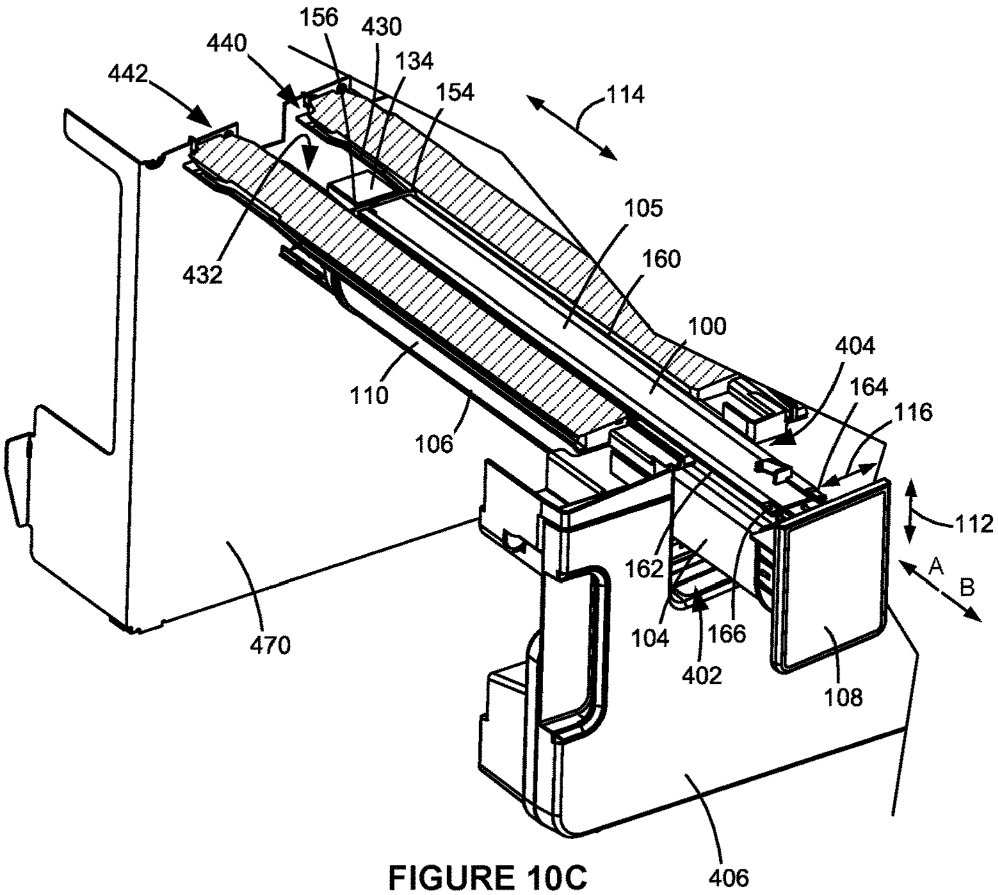
Figure 10D:
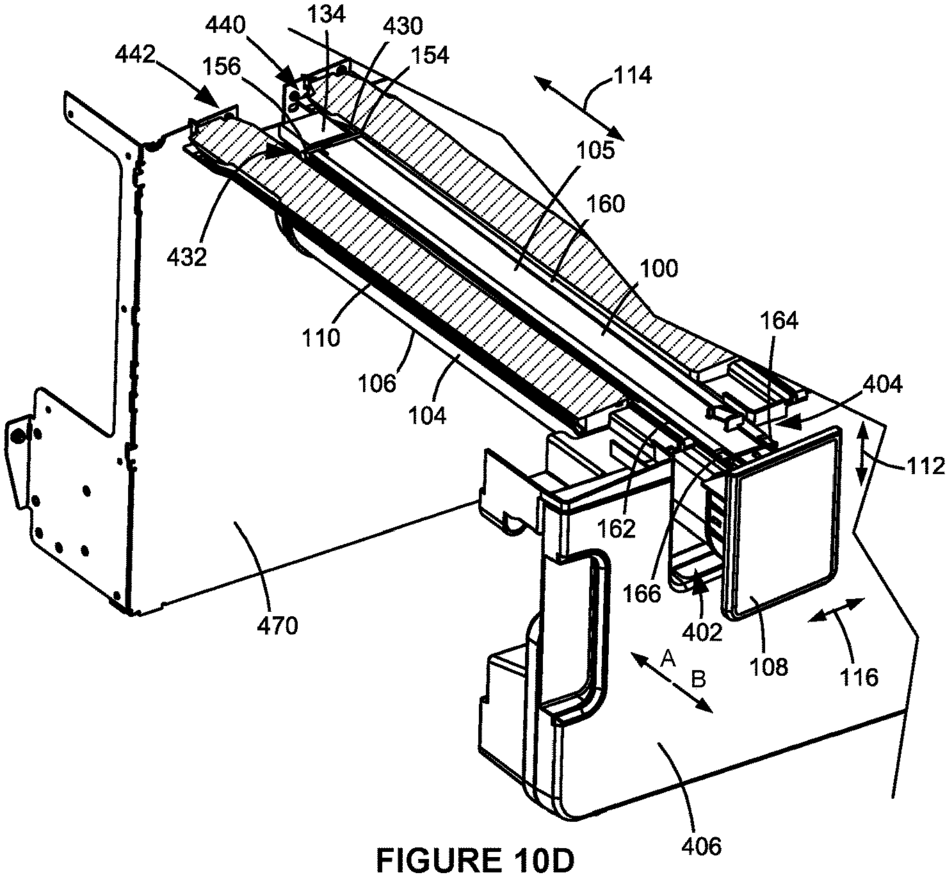
Figure 10E:
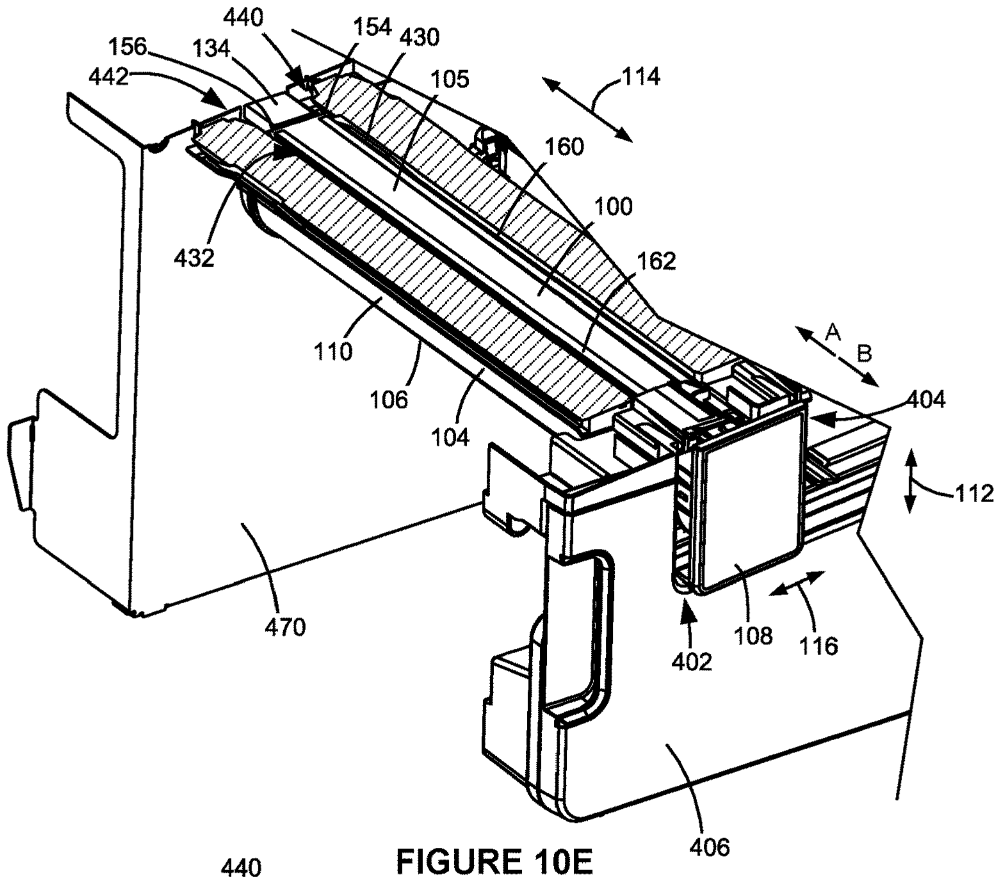
Figure 10F:
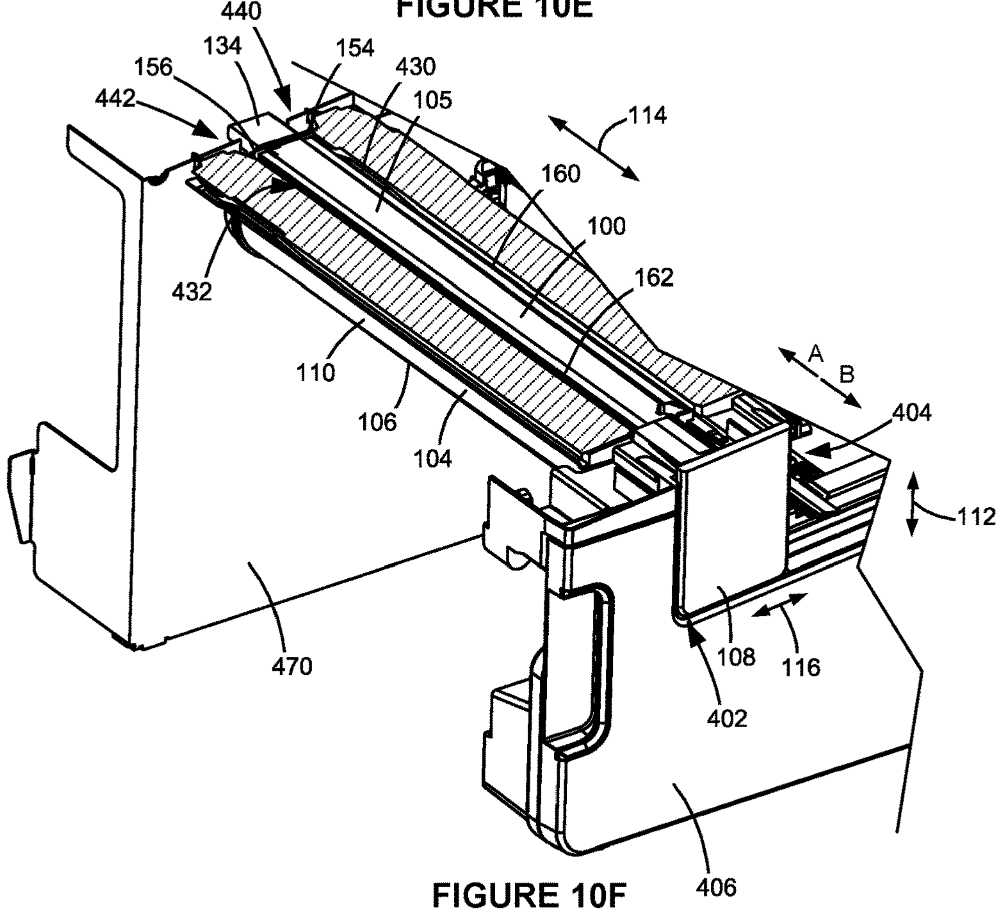
Figure 11A:
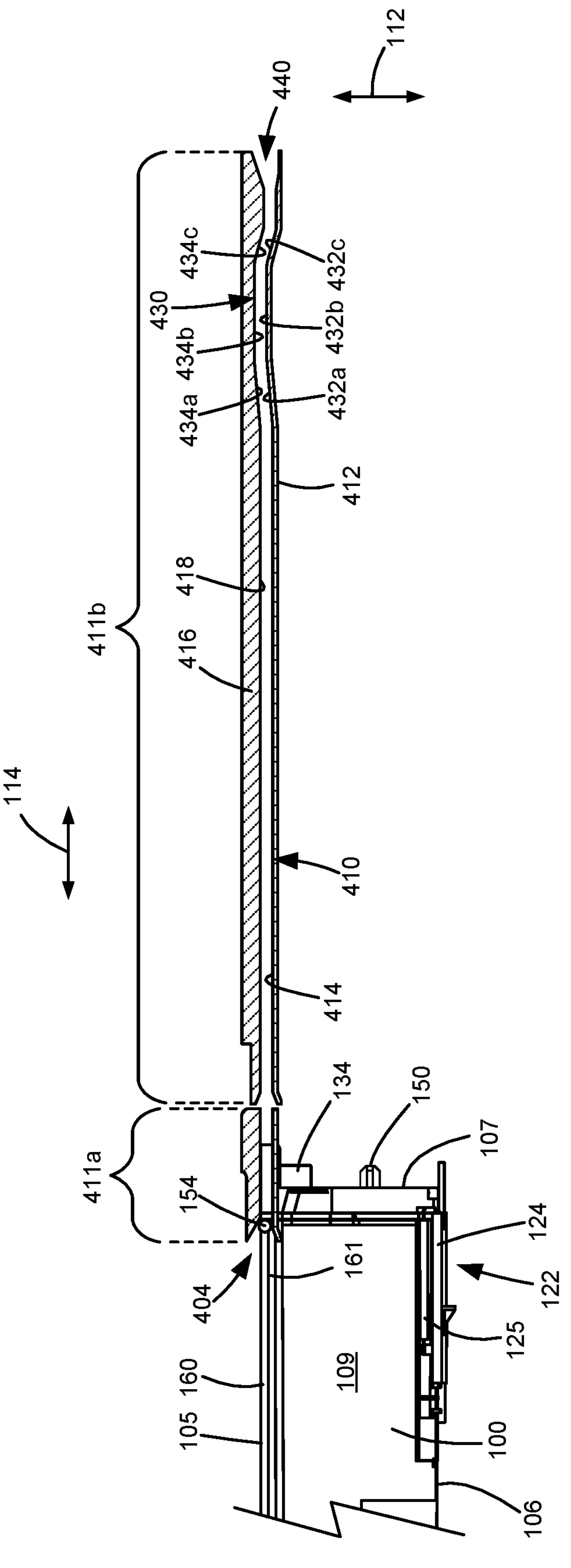
FIGS. 11A-11F are sequential schematic side views showing the insertion of a toner cartridge into a corresponding cartridge slot of the image forming device according to one example embodiment.

FIGS. 10A-10F and 11A-11F are sequential views illustrating the insertion of toner cartridge 100 into a corresponding cartridge slot 402 of image forming device 20 according to one example embodiment. The positions of toner cartridge 100 relative to image forming device 20 shown in FIGS. 10A-10F are the same as those shown in FIGS. 11A-11F, respectively. FIGS. 10A and 11A show toner cartridge 100 during its initial insertion into cartridge slot 402 of image forming device 20. As discussed above with respect to FIG. 9, engagement between guide posts 154, 156 and guide slots 410, 420 controls the vertical position of front end 107 of toner cartridge 100 as toner cartridge 100 enters cartridge slot 402.

Figure 11B:
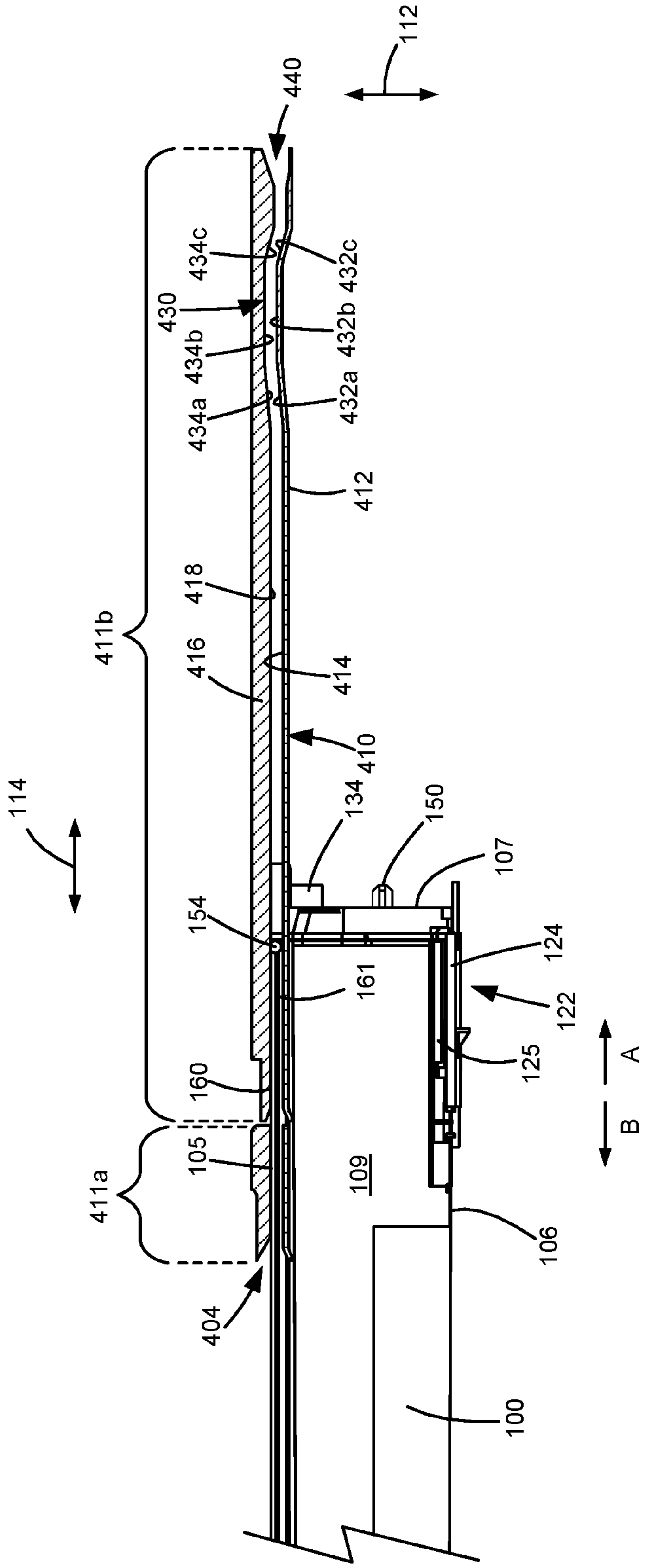

FIGS. 10B and 11B show toner cartridge 100 advanced further into cartridge slot 402 of image forming device 20 relative to the position shown in FIGS. 10A and 11A. As toner cartridge 100 advances into cartridge slot 402, guide posts 154, 156 travel within guide slots 410, 420, which control the vertical position and side-to-side position of front end 107 of toner cartridge 100 during insertion of toner cartridge 100 into image forming device 20, as discussed above. FIGS. 10B and 11B show guide posts 154, 156 positioned in second portions 411*b*, 421*b* of guide slots 410, 420. As toner cartridge 100 advances into cartridge slot 402 of image forming device 20, guide rails 160, 162 are received by first portions 411*a*. 421*a* of guide slots 410, 420, respectively. The engagement between guide rails 160, 162 and first portions 411*a*, 421*a* of guide slots 410, 420 controls the vertical position of toner cartridge 100 at entrance opening 404 of cartridge slot 402. Specifically, contact between bottom contact surfaces 161, 163 of guide rails 160, 162 and top contact surfaces 414, 424 of bottom guides 412, 422 of first portions 411*a*, 421*a* of guide slots 410, 420 limits downward movement of toner cartridge 100 at entrance opening 404 and generally controls the vertical position of toner cartridge 100 at entrance opening 404 of cartridge slot 402. Bottom contact surfaces 418, 428 of top guides 416, 426 of first portions 411*a*, 421*a* of guide slots 410, 420 limit upward movement of guide rails 160, 162 of toner cartridge 100 in order to limit upward movement of toner cartridge 100 at entrance opening 404 of cartridge slot 402 during insertion of toner cartridge 100 into image forming device 20. In this manner, engagement between guide posts 154, 156 and second portions 411*b*, 421*b* of guide slots 410, 420 and engagement between guide rails 160, 162 and first portions 411*a*, 421*a* of guide slots 410, 420 combine to support toner cartridge 100 during insertion into cartridge slot 402 of image forming device 20.

As discussed above, in the example embodiment illustrated, bottom guides 412, 422 and top guides 416, 426 of first portions 411*a*, 421*a* of guide slots 410, 420 protrude further along side-to-side dimension 116 of toner cartridge 100 than bottom guides 412, 422 and top guides 416, 426 of second portions 411*b*, 421*b* of guide slots 410, 420 such that guide rails 160, 162 of toner cartridge 100 are able to contact bottom guides 412, 422 and top guides 416, 426 of first portions 411*a*, 421*a* of guide slots 410, 420 but not second portions 411*b*, 421*b* of guide slots 410, 420. Accordingly, as toner cartridge 100 advances into cartridge slot 402 of image forming device 20, toner cartridge 100 is supported at front end 107 by the engagement between guide slots 410, 420 and guide posts 154, 156 and at entrance opening 404 by the engagement between first portions 411*a*, 421*a* of guide slots 410, 420 and guide rails 160, 162, but the portions of guide rails 160, 162 positioned in second portions 411*b*, 421*b* of guide slots 410, 420 extending from first portions 411*a*, 421*a* of guide slots 410, 420 to guide posts 154, 156 are not supported in order to avoid over-constraining toner cartridge 100 during insertion into image forming device 20.

In the example embodiment illustrated, side surfaces 450, 452 of guide slots 410, 420 limit the side-to-side movement of front end 107 of toner cartridge 100 during insertion into image forming device 20. Specifically, contact between side surfaces 450, 452 of guide slots 410, 420 and guide posts 154, 156 of toner cartridge 100 limits the extent of travel of front end 107 of toner cartridge 100 along side-to-side dimension 116 of toner cartridge 100. In the example embodiment illustrated, bottom guides 412, 422 of guide slots 410, 420 also limit the side-to-side movement of toner cartridge 100 along the length of toner cartridge 100 during insertion into image forming device 20. Specifically, contact between bottom guides 412, 422 of guide slots 410, 420 and ribs 174, 176 extending along the length of toner cartridge 100 limits the extent of travel of toner cartridge 100 along side-to-side dimension 116 of toner cartridge 100 in order to further control the position of toner cartridge 100 along side-to-side dimension 116 of toner cartridge 100 during insertion of toner cartridge 100 into image forming device 20.

Figure 11C:
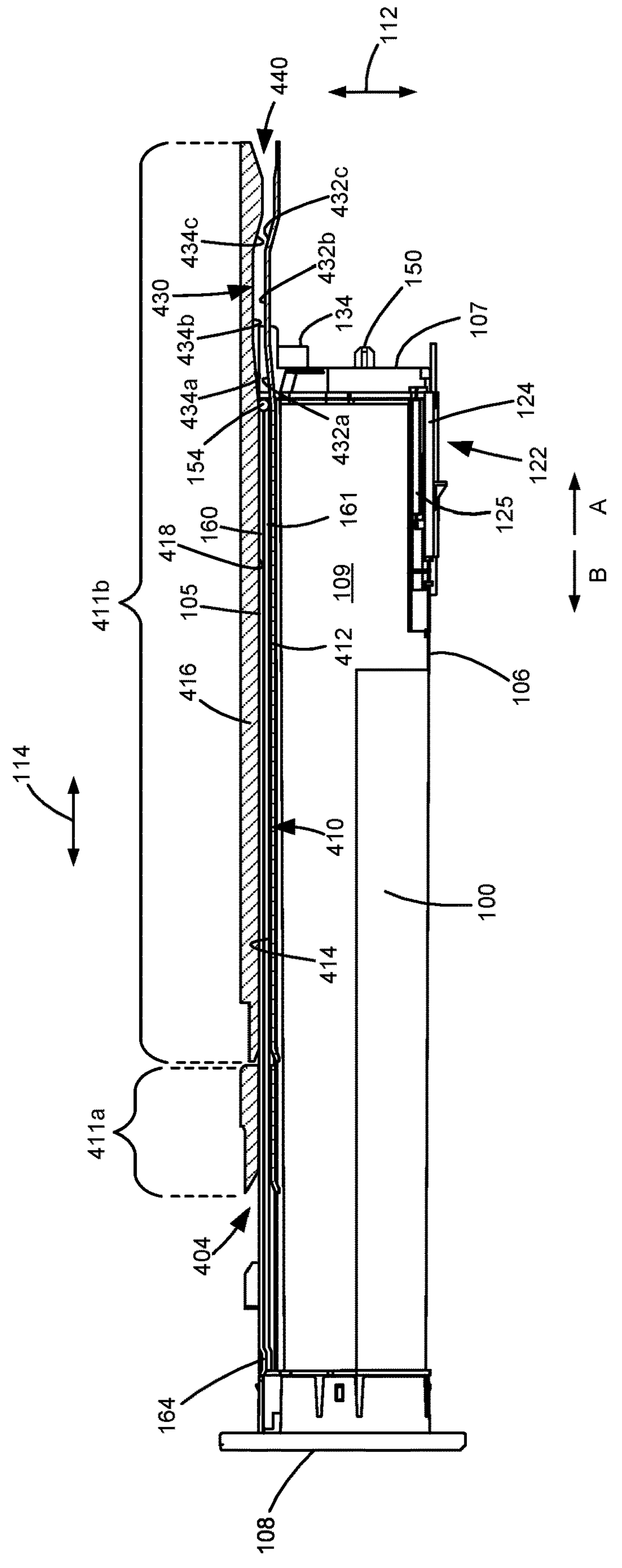

FIGS. 10C and 11C show toner cartridge 100 advanced further into cartridge slot 402 of image forming device 20 relative to the position shown in FIGS. 10B and 11B. FIGS. 10C and 11C show guide posts 154, 156 of toner cartridge 100 approaching raised sections 430, 431 of guide slots 410, 420 and guide rails 160, 162 of toner cartridge 100 advanced further along guide slots 410, 420.

Figure 11D:
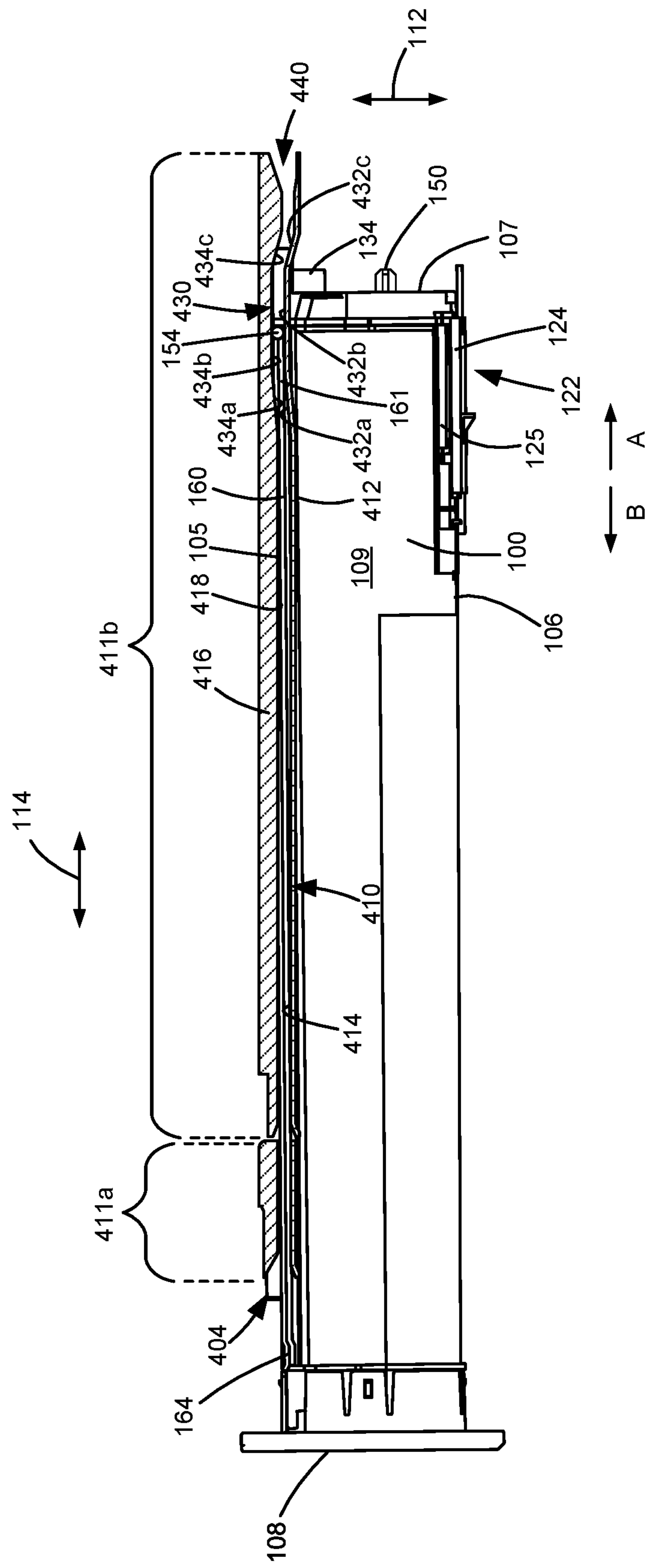

FIGS. 10D and 11D show toner cartridge 100 advanced further into cartridge slot 402 of image forming device 20 relative to the position shown in FIGS. 10C and 11C. As toner cartridge 100 advances into cartridge slot 402, in the embodiment illustrated, guide posts 154, 156 travel up inclined portions 432*a*, 433*a* of top contact surfaces 414, 424 of bottom guides 412, 422 of guide slots 410, 420 toward raised portions 432*b*, 433*b* of top contact surfaces 414, 424 of bottom guides 412, 422. FIGS. 10D and 11D show guide posts 154, 156 positioned on raised portions 432*b*, 433*b* of top contact surfaces 414, 424 of bottom guides 412, 422. In this embodiment, front end 107 of toner cartridge 100 is raised by raised sections 430, 431 of guide slots 410, 420 as toner cartridge 100 nears distal end 405 of cartridge slot 402 in order to lift shutter 124 of toner cartridge 100 above and clear of a seal positioned on a shutter at the inlet port of developer unit 200 in order to avoid contacting and potentially damaging the seal of developer unit 200, which could cause toner leakage when toner flows from outlet port 122 of toner cartridge 100 to the inlet port of developer unit 200. As discussed above, in the embodiment illustrated, guide rails 160, 162 of toner cartridge 100 do not contact second portions 411*b*, 421*b* of guide slots 410, 420. This allows front end 107 of toner cartridge 100 to lift upward as guide posts 154, 156 of toner cartridge 100 travel through raised sections 430, 431 of guide slots 410, 420 without guide rails 160, 162 binding on top guides 416, 426 or bottom guides 412, 422 of guide slots 410, 420.

Figure 11E:
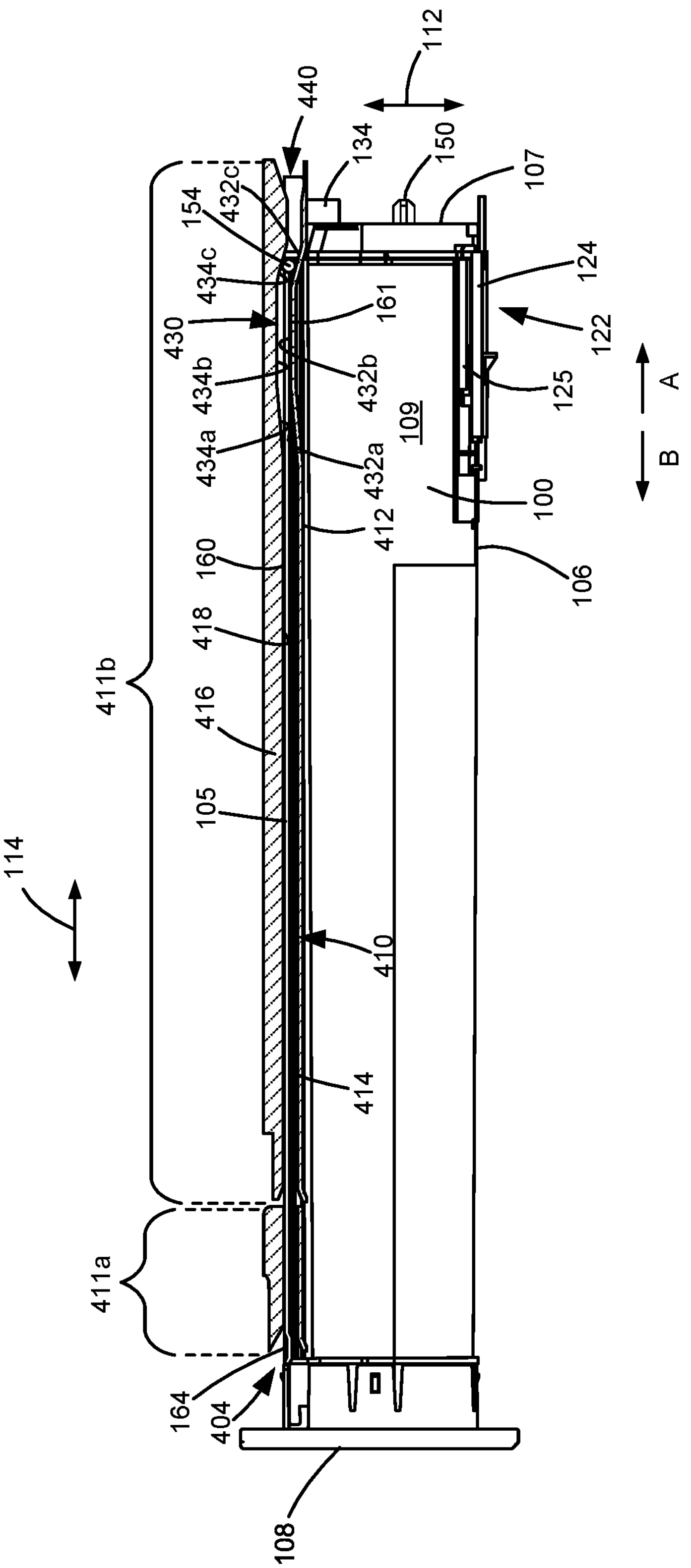

FIGS. 10E and 11E show toner cartridge 100 advanced further into cartridge slot 402 of image forming device 20 relative to the position shown in FIGS. 10D and 11D. As toner cartridge 100 advances from the position shown in FIGS. 10D and 11D, guide posts 154, 156 travel down declining portions 432*c*, 433*c* of top contact surfaces 414, 424 of bottom guides 412, 422 of guide slots 410, 420 allowing shutter 124 of toner cartridge 100 to lower onto the seal of the shutter at the inlet port of developer unit 200 in order to align shutter 124 of toner cartridge 100 with the shutter of developer unit 200 without damaging the seal of developer unit 200. As toner cartridge 100 advances further toward distal end 405 of cartridge slot 402, guide posts 154, 156 travel away from raised sections 430, 431 of guide slots 410, 420 and various interface features of toner cartridge 100 begin to align with mating features in image forming device 20. For example, in the embodiment illustrated, drive coupler 126 of toner cartridge 100 aligns with and moves toward the corresponding drive coupler in image forming device 20, and alignment guide 134 and electrical connector 130 of toner cartridge 100 align with and move toward the corresponding electrical connector in image forming device 20. Guide posts 150, 152 align with and move toward corresponding guide slots in image forming device 20.

Figure 11F:
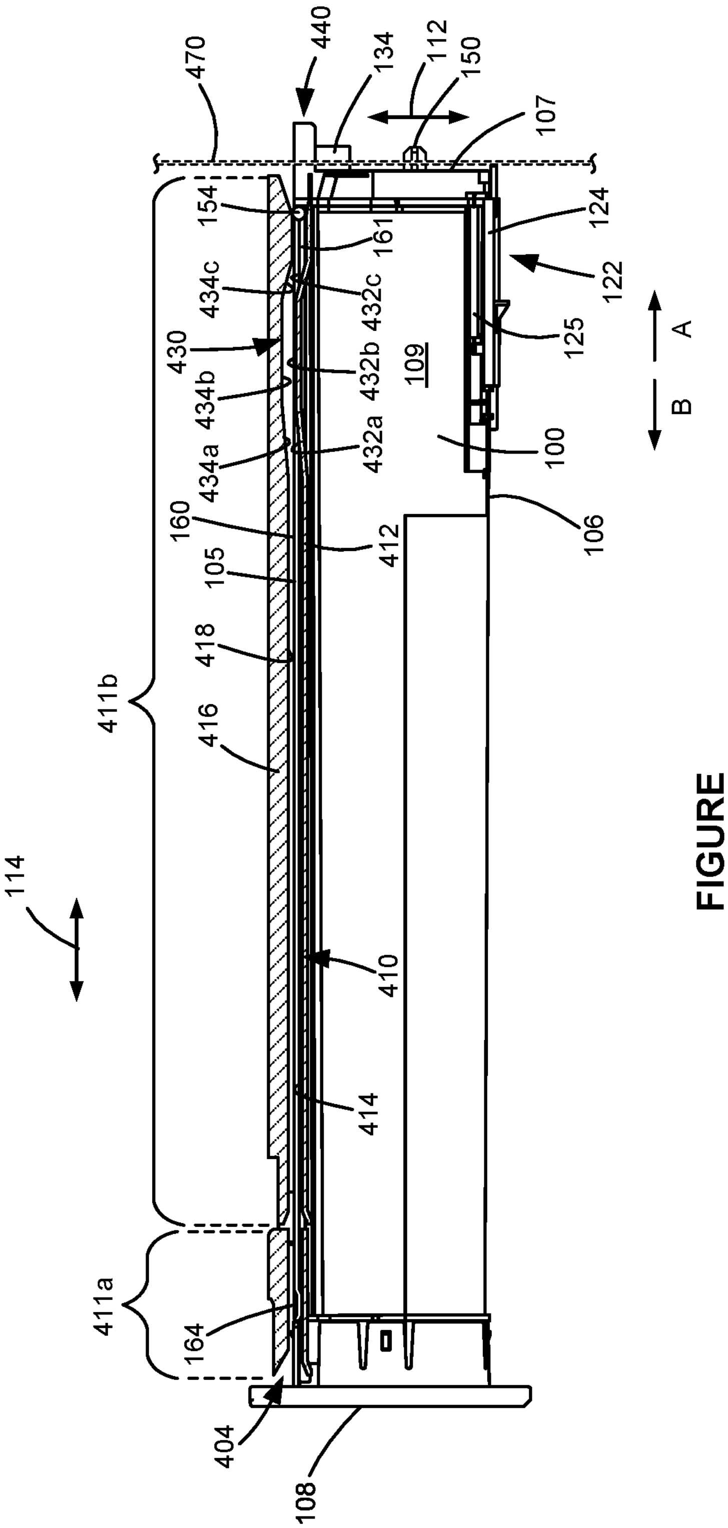
Figure 12:
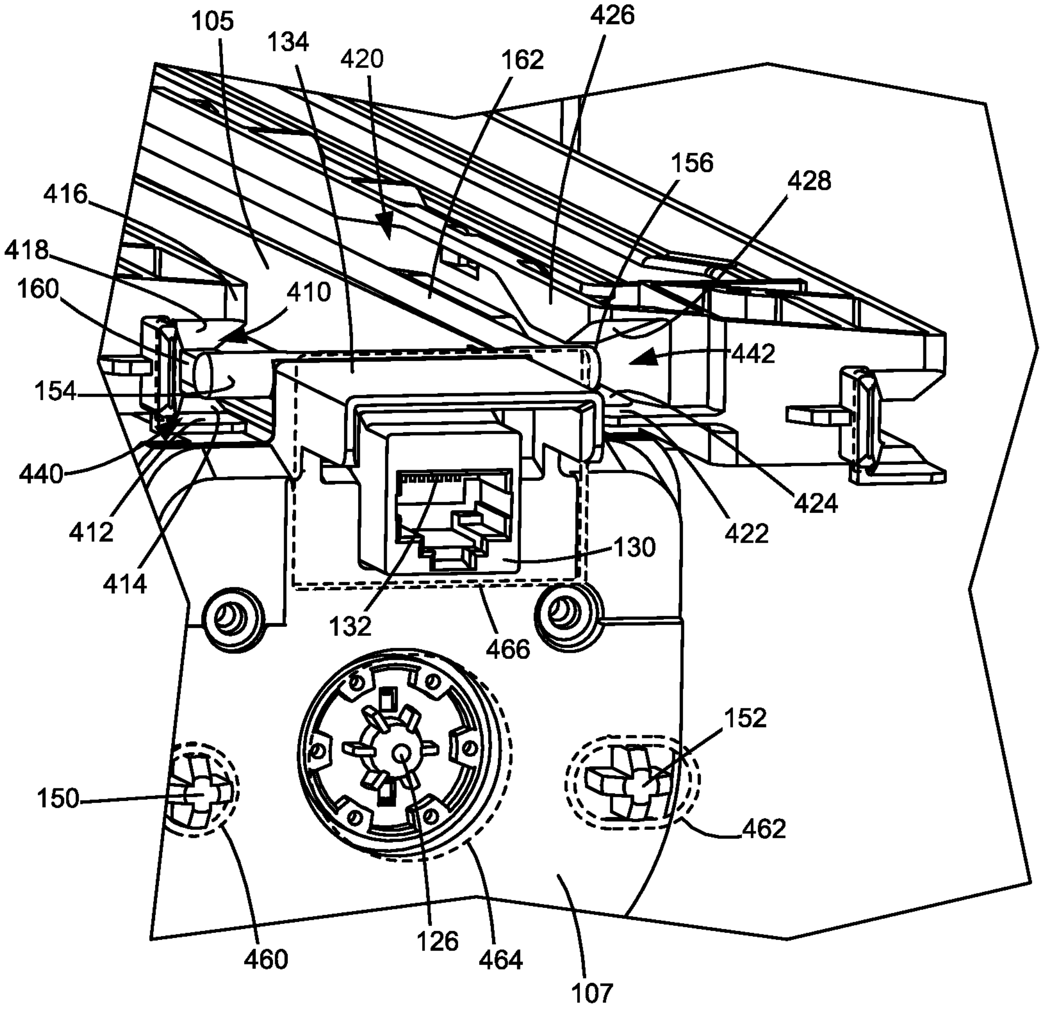
FIG. 12 is a perspective view of the toner cartridge in its final installed position in the image forming device schematically showing openings in a frame of the image forming device in dashed lines according to one example embodiment.

FIGS. 10F, 11F, 12 and 13 show toner cartridge 100 in its final installed position in image forming device 20, advanced further into cartridge slot 402 of image forming device 20 relative to the position shown in FIGS. 10D and 11D. With reference to FIGS. 10F, 11F and 12, as toner cartridge 100 reaches its final installed position in image forming device 20, guide posts 150, 152 on front end 107 of toner cartridge 100 enter corresponding guide slots 460, 462 formed in a frame 470 of image forming device 20. Openings in frame 470 of image forming device 20 forming guide slots 460, 462 are shown schematically in dashed lines in FIG. 12. FIG. 12 also shows openings 464, 466 in frame 470 of image forming device 20 which allow drive coupler 126 of toner cartridge 100 to operatively mate with the corresponding drive coupler in image forming device 20 and alignment guide 134 and electrical connector 130 of toner cartridge 100 to operatively mate with the corresponding electrical connector in image forming device 20, respectively, when toner cartridge 100 is in its final installed position in image forming device 20. In this embodiment, the engagement between guide posts 150, 152 and guide slots 460, 462 controls the position of front end 107 of toner cartridge 100 along vertical dimension 112 and side-to-side dimension 116 of toner cartridge 100 when toner cartridge 100 is in its final installed position in image forming device 20 in order to ensure that the interface features of toner cartridge 100 positioned at or near front end 107, such as outlet port 122, shutter 124, drive coupler 126, electrical connector 130 and alignment guide 134, accurately mate with corresponding features in image forming device 20. In this embodiment, where guide posts 150, 152 and alignment guide 134 are formed integrally with end cap 117 and drive coupler 126 and electrical connector 130 are located to end cap 117, using guide posts 150, 152 to locate front end 107 of toner cartridge 100 during print operation helps minimize the tolerance stackup between drive coupler 126 and the corresponding drive coupler in image forming device 20 and between alignment guide 134 and electrical connector 130 and the corresponding electrical connector in image forming device 20.

In the example embodiment illustrated, as toner cartridge 100 reaches its final installed position in image forming device 20, guide posts 154, 156 enter enlarged portions 440, 442 of guide slots 410, 420. The increased vertical gap between top contact surfaces 414, 424 of bottom guides 412, 422 and bottom contact surfaces 418, 428 of top guides 416, 426 of enlarged portions 440, 442 of guide slots 410, 420 provides clearance so that guide posts 154, 156 do not contact top contact surfaces 414, 424 of bottom guides 412, 422 or bottom contact surfaces 418, 428 of top guides 416, 426 when toner cartridge 100 is in its final installed position in image forming device 20, as shown in FIG. 12, in order to avoid over-constraining toner cartridge 100.

Figure 13:
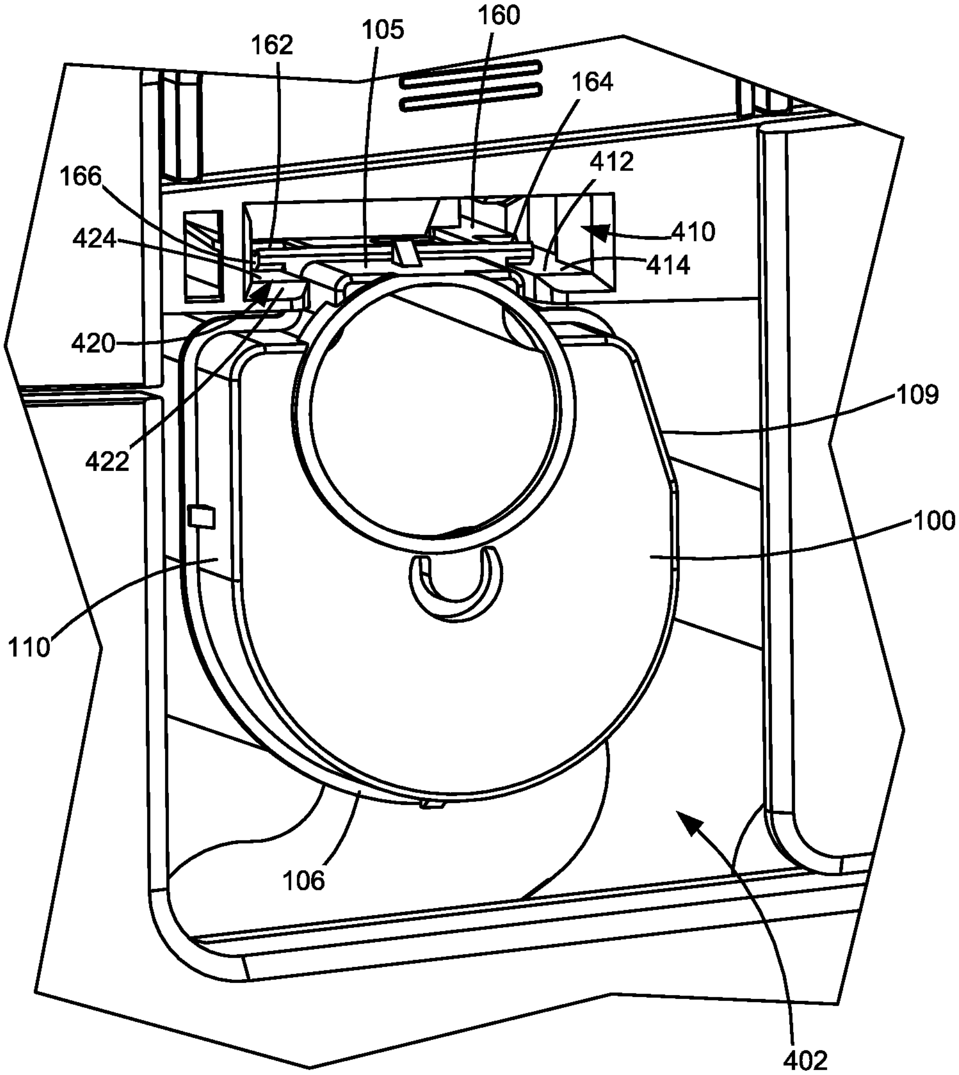
FIG. 13 is a perspective view of the toner cartridge in its final installed position in the image forming device with an end cap at a rear end of the toner cartridge omitted according to one example embodiment.

FIG. 13 shows rear end 108 of toner cartridge 100, with end cap 118 omitted for clarity, when toner cartridge 100 is in its final installed position in cartridge slot 402 of image forming device 20. With reference to FIGS. 10F, 11F and 13, when toner cartridge 100 is in its final installed position in image forming device 20, datum points 164, 166 at rear ends 160*b*, 162*b* of guide rails 160, 162 of toner cartridge 100 are positioned on top contact surfaces 414, 424 of bottom guides 412, 422 of first portions 411*a*, 421*a* of guide slots 410, 420. In this embodiment, contact between datum points 164, 166 of guide rails 160, 162 and top contact surfaces 414, 424 of bottom guides 412, 422 of first portions 411*a*, 421*a* of guide slots 410, 420 controls the position of rear end 108 of toner cartridge 100 along vertical dimension 112 of toner cartridge 100 when toner cartridge 100 is in its final installed position in image forming device 20.

When toner cartridge 100 is removed from image forming device 20 along direction of removal B, this sequence is reversed. Toner cartridge 100 is supported during removal from image forming device 20 at front end 107 of toner cartridge 100 by the engagement between guide slots 410, 420 and guide posts 154, 156 and at entrance opening 404 of cartridge slot 402 by the engagement between first portions 411*a*, 421*a* of guide slots 410, 420 and guide rails 160, 162, as discussed above.

Accordingly, it will be appreciated that the present disclosure provides relatively simple and intuitive installation and removal of toner cartridge 100 into and out of image forming device 20 while also providing accurate positioning of interface features of toner cartridge 100 relative to corresponding features in image forming device 20 during operation.

Although the example embodiment shown in FIG. 1 includes toner cartridges 100, developer units 200 and PC units 300 positioned in separate replaceable units, it will be appreciated that the replaceable unit(s) of image forming device 20 may employ any suitable configuration as desired. For example, in one embodiment, the main toner supply for image forming device 20, developer unit 200 and PC unit 300 are combined in a separate replaceable unit for each color toner. In another embodiment, the main toner supply for image forming device 20 and developer unit 200 are provided in a first replaceable unit and PC unit 300 is provided in a second replaceable unit. Other combinations are possible without departing from the scope of the present disclosure.

Further, although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a body having a top, a bottom, a first side and a second side positioned between a first longitudinal end and a second longitudinal end of the body, a longitudinal dimension of the toner container that is orthogonal to a vertical dimension of the toner container extends between the first longitudinal end of the body and the second longitudinal end of the body, the body has a reservoir for holding toner;

an outlet port on the bottom of the body for exiting toner from the toner container, the outlet port is positioned closer to the first longitudinal end of the body than to the second longitudinal end of the body;

a drive coupler on the first longitudinal end of the body for mating with a corresponding drive coupler in the image forming device when the toner container is installed in the image forming device for receiving rotational motion from the corresponding drive coupler in the image forming device;

an electrical contact on the first longitudinal end of the body for contacting a corresponding electrical contact in the image forming device when the toner container is installed in the image forming device, the electrical contact of the toner container is positioned higher in the vertical dimension of the toner container than the drive coupler of the toner container; and a first guide post and a second guide post projecting outward along the longitudinal dimension of the toner container from the first longitudinal end of the body, the first guide post is spaced toward the first side of the body from the drive coupler of the toner container, the second guide post is spaced toward the second side of the body from the drive coupler of the toner container, the first guide post and the second guide post overlap with the drive coupler of the toner container along the vertical dimension of the toner container such that an imaginary horizontal plane intersects the first and second guide posts and the drive coupler of the toner container.

2. The toner container of claim 1, wherein the first guide post is positioned closer to the first side of the body than to the second side of the body, and the second guide post is positioned closer to the second side of the body than to the first side of the body.

3. The toner container of claim 2, wherein the first guide post is spaced along a side-to-side dimension of the toner container that is orthogonal to the longitudinal dimension of the toner container and the vertical dimension of the toner container from the first side of the body, and the second guide post is spaced along the side-to-side dimension of the toner container from the second side of the body.

4. The toner container of claim 1, wherein a bottom surface of the first guide post and a bottom surface of the second guide post are positioned lower in the vertical dimension of the toner container than a rotational axis of the drive coupler of the toner container.

5. The toner container of claim 1, wherein the first guide post and the second guide post are positioned equidistant from a rotational axis of the drive coupler of the toner container along a side-to-side dimension of the toner container that is orthogonal to the longitudinal dimension of the toner container and the vertical dimension of the toner container and that extends between the first side of the body and the second side of the body.

6. The toner container of claim 1, further comprising a third guide post and a fourth guide post at the top of the body and near the first longitudinal end of the body, the third guide post and the fourth guide post project outward along a side-to-side dimension of the toner container that is orthogonal to the longitudinal dimension of the toner container and the vertical dimension of the toner container and that extends between the first side of the body and the second side of the body, the third guide post projects toward the first side of the body and the fourth guide post projects toward the second side of the body, bottom surfaces of the third and fourth guide posts are unobstructed to contact and ride along top surfaces of corresponding guides in the image forming device during insertion of the toner container into the image forming device for controlling a position of the first longitudinal end of the body along the vertical dimension of the toner container during insertion of the toner container into the image forming device.

7. The toner container of claim 6, wherein the third and fourth guide posts are positioned closer to the first longitudinal end of the body than the outlet port is to the first longitudinal end of the body.

8. The toner container of claim 6, further comprising a first guide rail and a second guide rail at the top of the body, the first and second guide rails extend along the longitudinal dimension of the toner container and project outward along the side-to-side dimension of the toner container, the first guide rail projects toward the first side of the body and the second guide rail projects toward the second side of the body, the third and fourth guide posts are positioned at front ends of the first and second guide rails and project further outward along the side-to-side dimension of the toner container than the first and second guide rails, bottom surfaces of the first and second guide rails are unobstructed to contact and ride along the top surfaces of the corresponding guides in the image forming device during insertion of the toner container into the image forming device for controlling a position of the toner container along the vertical dimension of the toner container during insertion of the toner container into the image forming device.

9. The toner container of claim 8, further comprising:

a primarily vertical wall positioned immediately below each of the first and second guide rails, the primarily vertical walls are inset from outer edges of the first and second guide rails, respectively, and the primarily vertical walls taper in the side-to-side dimension of the toner container along the longitudinal dimension of the toner container; and a rib extending outward along the side-to-side dimension of the toner container from each primarily vertical wall, the first and second guide rails extend further outward along the side-to-side dimension of the toner container than the ribs, the ribs protrude further relative to the primarily vertical walls near one of the first and second longitudinal ends of the body than near the other of the first and second longitudinal ends of the body such that an outer surface of each rib has a constant position in the side-to-side dimension of the toner container along the longitudinal dimension of the toner container for limiting an extent of travel of the toner container along the side-to-side dimension of the toner container during insertion of the toner container into the image forming device.

10. The toner container of claim 8, further comprising a datum point at a respective rear end of each of the first and second guide rails for controlling a position of the second longitudinal end of the body along the vertical dimension of the toner container when the toner container is installed in the image forming device, bottom surfaces of the datum points extend lower along the vertical dimension of the toner container than bottom surfaces of the first and second guide rails.

11. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container that is orthogonal to a vertical dimension of the toner container extends between the first longitudinal end of the body and the second longitudinal end of the body, a side-to-side dimension of the toner container that is orthogonal to the longitudinal dimension of the toner container and the vertical dimension of the toner container extends between the first side of the body and the second side of the body, the body has a reservoir for holding toner;

an outlet port on the bottom of the body for exiting toner from the toner container, the outlet port is positioned closer to the first longitudinal end of the body than to the second longitudinal end of the body;

a drive coupler on the first longitudinal end of the body for mating with a corresponding drive coupler in the image forming device when the toner container is installed in the image forming device for receiving rotational motion from the corresponding drive coupler in the image forming device;

an electrical contact on the first longitudinal end of the body for contacting a corresponding electrical contact in the image forming device when the toner container is installed in the image forming device, the electrical contact of the toner container is electrically connected to processing circuitry on the toner container, the electrical contact of the toner container is positioned higher in the vertical dimension of the toner container than the drive coupler of the toner container; and a first guide post and a second guide post projecting outward along the longitudinal dimension of the toner container from the first longitudinal end of the body for controlling a position of the first longitudinal end of the body along the vertical dimension of the toner container and the side-to-side dimension of the toner container when the toner container is installed in the image forming device and the first and second guide posts are received by corresponding first and second guide slots in the image forming device, the first guide post is positioned closer to the first side of the body than to the second side of the body, the second guide post is positioned closer to the second side of the body than to the first side of the body, the first guide post is positioned closer to the first side of the body than the drive coupler of the toner container is to the first side of the body, the second guide post is positioned closer to the second side of the body than the drive coupler of the toner container is to the second side of the body, a bottom surface of the first guide post and a bottom surface of the second guide post are positioned lower in the vertical dimension of the toner container than a rotational axis of the drive coupler of the toner container and higher in the vertical dimension of the toner container than a bottom end of the drive coupler of the toner container.

12. The toner container of claim 11, wherein the first guide post is spaced along the side-to-side dimension of the toner container from the first side of the body, and the second guide post is spaced along the side-to-side dimension of the toner container from the second side of the body.

13. The toner container of claim 11, wherein the first guide post and the second guide post are positioned equidistant from the rotational axis of the drive coupler of the toner container along the side-to-side dimension of the toner container.

14. The toner container of claim 11, further comprising a third guide post and a fourth guide post at the top of the body and near the first longitudinal end of the body, the third guide post and the fourth guide post project outward along the side-to-side dimension of the toner container, the third guide post projects toward the first side of the body and the fourth guide post projects toward the second side of the body, bottom surfaces of the third and fourth guide posts are unobstructed to contact and ride along top surfaces of corresponding guides in the image forming device during insertion of the toner container into the image forming device for controlling a position of the first longitudinal end of the body along the vertical dimension of the toner container during insertion of the toner container into the image forming device.

15. The toner container of claim 14, wherein the third and fourth guide posts are positioned closer to the first longitudinal end of the body than the outlet port is to the first longitudinal end of the body.

16. The toner container of claim 14, further comprising a first guide rail and a second guide rail at the top of the body, the first and second guide rails extend along the longitudinal dimension of the toner container and project outward along the side-to-side dimension of the toner container, the first guide rail projects toward the first side of the body and the second guide rail projects toward the second side of the body, the third and fourth guide posts are positioned at front ends of the first and second guide rails and project further outward along the side-to-side dimension of the toner container than the first and second guide rails, bottom surfaces of the first and second guide rails are unobstructed to contact and ride along the top surfaces of the corresponding guides in the image forming device during insertion of the toner container into the image forming device for controlling a position of the toner container along the vertical dimension of the toner container during insertion of the toner container into the image forming device.

17. The toner container of claim 16, further comprising:

a primarily vertical wall positioned immediately below each of the first and second guide rails, the primarily vertical walls are inset from outer edges of the first and second guide rails, respectively, and the primarily vertical walls taper in the side-to-side dimension of the toner container along the longitudinal dimension of the toner container; and a rib extending outward along the side-to-side dimension of the toner container from each primarily vertical wall, the first and second guide rails extend further outward along the side-to-side dimension of the toner container than the ribs, the ribs protrude further relative to the primarily vertical walls near one of the first and second longitudinal ends of the body than near the other of the first and second longitudinal ends of the body such that an outer surface of each rib has a constant position in the side-to-side dimension of the toner container along the longitudinal dimension of the toner container for limiting an extent of travel of the toner container along the side-to-side dimension of the toner container during insertion of the toner container into the image forming device.

18. The toner container of claim 16, further comprising a datum point at a respective rear end of each of the first and second guide rails for controlling a position of the second longitudinal end of the body along the vertical dimension of the toner container when the toner container is installed in the image forming device, bottom surfaces of the datum points extend lower along the vertical dimension of the toner container than bottom surfaces of the first and second guide rails.

19. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container that is orthogonal to a vertical dimension of the toner container extends between the first longitudinal end of the body and the second longitudinal end of the body, a side-to-side dimension of the toner container that is orthogonal to the longitudinal dimension of the toner container and the vertical dimension of the toner container extends between the first side of the body and the second side of the body, the body has a reservoir for holding toner;

an outlet port for exiting toner from the toner container;

a drive coupler on the first longitudinal end of the body for mating with a corresponding drive coupler in the image forming device when the toner container is installed in the image forming device for receiving rotational motion from the corresponding drive coupler in the image forming device; and a first guide post and a second guide post projecting outward along the longitudinal dimension of the toner container from the first longitudinal end of the body for controlling a position of the first longitudinal end of the body along the vertical dimension of the toner container and the side-to-side dimension of the toner container when the toner container is installed in the image forming device and the first and second guide posts are received by corresponding first and second guide slots in the image forming device, the first guide post is positioned closer to the first side of the body than to the second side of the body, the second guide post is positioned closer to the second side of the body than to the first side of the body, a bottom surface of the first guide post and a bottom surface of the second guide post are positioned lower in the vertical dimension of the toner container than a rotational axis of the drive coupler of the toner container and higher in the vertical dimension of the toner container than a bottom end of the drive coupler of the toner container, the first guide post and the second guide post are positioned equidistant from the rotational axis of the drive coupler of the toner container along the side-to-side dimension of the toner container.

20. The toner container of claim 19, wherein the first guide post is spaced along the side-to-side dimension of the toner container from the first side of the body, and the second guide post is spaced along the side-to-side dimension of the toner container from the second side of the body.

21. The toner container of claim 19, further comprising a third guide post and a fourth guide post at the top of the body and near the first longitudinal end of the body, the third guide post and the fourth guide post project outward along the side-to-side dimension of the toner container, the third guide post projects toward the first side of the body and the fourth guide post projects toward the second side of the body, bottom surfaces of the third and fourth guide posts are unobstructed to contact and ride along top surfaces of corresponding guides in the image forming device during insertion of the toner container into the image forming device for controlling a position of the first longitudinal end of the body along the vertical dimension of the toner container during insertion of the toner container into the image forming device.

22. The toner container of claim 21, wherein the third and fourth guide posts are positioned closer to the first longitudinal end of the body than the outlet port is to the first longitudinal end of the body.

23. The toner container of claim 21, further comprising a first guide rail and a second guide rail at the top of the body, the first and second guide rails extend along the longitudinal dimension of the toner container and project outward along the side-to-side dimension of the toner container, the first guide rail projects toward the first side of the body and the second guide rail projects toward the second side of the body, the third and fourth guide posts are positioned at front ends of the first and second guide rails and project further outward along the side-to-side dimension of the toner container than the first and second guide rails, bottom surfaces of the first and second guide rails are unobstructed to contact and ride along the top surfaces of the corresponding guides in the image forming device during insertion of the toner container into the image forming device for controlling a position of the toner container along the vertical dimension of the toner container during insertion of the toner container into the image forming device.

24. The toner container of claim 23, further comprising:

a primarily vertical wall positioned immediately below each of the first and second guide rails, the primarily vertical walls are inset from outer edges of the first and second guide rails, respectively, and the primarily vertical walls taper in the side-to-side dimension of the toner container along the longitudinal dimension of the toner container; and a rib extending outward along the side-to-side dimension of the toner container from each primarily vertical wall, the first and second guide rails extend further outward along the side-to-side dimension of the toner container than the ribs, the ribs protrude further relative to the primarily vertical walls near one of the first and second longitudinal ends of the body than near the other of the first and second longitudinal ends of the body such that an outer surface of each rib has a constant position in the side-to-side dimension of the toner container along the longitudinal dimension of the toner container for limiting an extent of travel of the toner container along the side-to-side dimension of the toner container during insertion of the toner container into the image forming device.

25. The toner container of claim 23, further comprising a datum point at a respective rear end of each of the first and second guide rails for controlling a position of the second longitudinal end of the body along the vertical dimension of the toner container when the toner container is installed in the image forming device, bottom surfaces of the datum points extend lower along the vertical dimension of the toner container than bottom surfaces of the first and second guide rails.

* * * * *